US011915607B2

(12) United States Patent
Ayana et al.

(10) Patent No.: US 11,915,607 B2
(45) Date of Patent: Feb. 27, 2024

(54) MODULAR REFRESHABLE BRAILLE DISPLAY SYSTEM

(71) Applicant: BRAILLEAZY, INC., Burnsville, MN (US)

(72) Inventors: Abenezer Ayana, Burnsville, MN (US); Mahamud Hussein, Saint Paul, MN (US); Lisan Hasnain, Plymouth, MN (US)

(73) Assignee: Brailleazy, Inc., Burnsville, MN (US)

( * ) Notice: Subject to any disclaimer, the term of this patent is extended or adjusted under 35 U.S.C. 154(b) by 0 days.

(21) Appl. No.: 18/127,311

(22) Filed: Mar. 28, 2023

(65) Prior Publication Data
US 2023/0298483 A1  Sep. 21, 2023

Related U.S. Application Data

(63) Continuation of application No. 17/330,669, filed on May 26, 2021, now Pat. No. 11,640,769.

(60) Provisional application No. 63/031,693, filed on May 29, 2020.

(51) Int. Cl.
*G09B 21/00* (2006.01)
(52) U.S. Cl.
CPC ................... *G09B 21/004* (2013.01)
(58) Field of Classification Search
CPC .................................................. G09B 21/004
See application file for complete search history.

(56) References Cited

U.S. PATENT DOCUMENTS

| | | | | | |
|---|---|---|---|---|---|
| 3,987,438 | A | * | 10/1976 | Lindenmueller | G09B 21/004 340/407.1 |
| 5,226,817 | A | * | 7/1993 | Nakajima | G09B 21/004 434/117 |
| 5,449,292 | A | * | 9/1995 | Tani | G09B 21/004 434/114 |
| 5,766,014 | A | * | 6/1998 | Ida | G09F 9/37 434/114 |
| 5,772,440 | A | * | 6/1998 | Ida | G09B 21/004 340/407.1 |

(Continued)

FOREIGN PATENT DOCUMENTS

| | | |
|---|---|---|
| CA | 3055483 A1 | 10/2018 |
| JP | 3683195 | 8/2005 |
| WO | 2020183439 A1 | 9/2020 |

*Primary Examiner* — Vinh T Lam
(74) *Attorney, Agent, or Firm* — Barnes & Thornburg LLP

(57) ABSTRACT

This specification generally discloses an apparatus, system and method for refreshable braille display. The apparatus can include a first base having a contact surface and a plurality of cavities. The contact surface can be configured to receive fingertips. The plurality of cavities can be recessed from the contact surface. A plurality of pins can be housed within the plurality of cavities and configured to move in the plurality of cavities to selectively extend from the contact surface of the first base. A plurality of solenoids can be configured to at least partially operably connect to the plurality of pins. A controller can be configured to selectively provide a first electric current to the plurality of solenoids to generate first magnetic fields through the plurality of solenoids. The first magnetic fields can be configured to selectively move the plurality of pins to extend from the contact surface of the first base.

20 Claims, 23 Drawing Sheets

(56) References Cited

U.S. PATENT DOCUMENTS

| | | | | |
|---|---|---|---|---|
| 6,086,273 A * | 7/2000 | Hong | G09B 21/004 | 400/98 |
| 6,217,338 B1 * | 4/2001 | Tieman | G09B 23/306 | 434/114 |
| 6,705,868 B1 * | 3/2004 | Schleppenbach | G09B 21/004 | 434/114 |
| 6,734,785 B2 * | 5/2004 | Petersen | G09B 21/004 | 340/407.1 |
| 6,743,021 B2 | 6/2004 | Prince et al. | | |
| 6,819,228 B2 * | 11/2004 | Gipson | G09B 21/004 | 340/407.1 |
| 6,881,063 B2 * | 4/2005 | Yang | G09B 21/004 | 434/114 |
| 6,902,403 B1 * | 6/2005 | Goldenberg | G09B 21/004 | 340/407.1 |
| 6,908,009 B2 * | 6/2005 | Rahamim | G09B 21/004 | 221/232 |
| 7,009,595 B2 * | 3/2006 | Roberts | G09B 21/004 | 715/702 |
| 7,018,209 B2 * | 3/2006 | Schleppenbach | G09B 21/004 | 434/114 |
| 7,083,416 B1 * | 8/2006 | Goldenbert | G09B 21/004 | 434/114 |
| 7,097,457 B2 * | 8/2006 | Kajino | G09B 21/004 | 434/112 |
| 7,226,291 B2 * | 6/2007 | Spedden | G09B 21/003 | 340/407.1 |
| 7,367,806 B1 * | 5/2008 | Murphy | G09B 21/004 | 434/112 |
| 7,497,687 B2 * | 3/2009 | Shin | G09B 21/004 | 434/114 |
| 7,722,355 B2 * | 5/2010 | Murphy | G09B 21/004 | 434/112 |
| 7,723,896 B2 * | 5/2010 | Esashi | G09B 21/004 | 60/527 |
| 7,777,137 B2 * | 8/2010 | Ahn | G09B 21/004 | 434/112 |
| 8,047,849 B2 * | 11/2011 | Ahn | G09B 21/004 | 434/114 |
| 8,360,778 B2 * | 1/2013 | Murphy | G09B 21/004 | 434/112 |
| 8,411,058 B2 * | 4/2013 | Wong | G06F 3/011 | 715/701 |
| 8,483,018 B2 * | 7/2013 | Anderson | G09B 21/003 | 368/230 |
| 8,547,341 B2 * | 10/2013 | Takashima | G06F 3/016 | 345/173 |
| 8,602,786 B2 * | 12/2013 | Takahashi | G09B 21/004 | 434/112 |
| 8,633,907 B2 | 1/2014 | Mahalingam | | |
| 8,690,576 B2 * | 4/2014 | Murphy | G09B 21/004 | 434/114 |
| 8,740,618 B2 * | 6/2014 | Shaw | G09B 21/003 | 340/407.1 |
| 8,770,981 B2 * | 7/2014 | Schroeder | G09B 21/004 | 434/114 |
| 9,142,143 B2 * | 9/2015 | Chari | G09B 21/004 | |
| 9,244,531 B2 * | 1/2016 | Takashima | G06F 3/016 | |
| 9,424,759 B2 * | 8/2016 | Murphy | G09B 21/00 | |
| 9,524,655 B1 * | 12/2016 | Campos de Leon | G09B 21/005 | |
| 9,613,544 B2 * | 4/2017 | Yang | G09B 21/004 | |
| 9,658,694 B2 * | 5/2017 | Takashima | G09B 21/004 | |
| 9,711,065 B2 * | 7/2017 | Yu | G06F 3/016 | |
| 9,727,167 B2 * | 8/2017 | Deokar | G06F 1/163 | |
| 9,734,731 B2 * | 8/2017 | Van Hees | G09B 21/00 | |
| 9,812,033 B2 * | 11/2017 | Chari | G09B 21/004 | |
| 9,965,036 B2 * | 5/2018 | Deokar | G06F 3/0445 | |
| 9,965,974 B2 * | 5/2018 | Labbé | G09B 21/025 | |
| 9,984,589 B2 * | 5/2018 | Jain | G09B 21/00 | |
| 10,055,053 B2 * | 8/2018 | Klein | H04L 9/3231 | |
| 10,121,335 B2 * | 11/2018 | Deokar | G09B 21/004 | |
| 10,127,832 B2 * | 11/2018 | Moon | G09B 21/004 | |
| 10,163,367 B2 * | 12/2018 | Moon | G09B 21/004 | |
| 10,175,882 B2 | 1/2019 | Labbe et al. | | |
| 10,229,614 B2 * | 3/2019 | Karadag | G09B 23/04 | |
| 10,249,217 B2 * | 4/2019 | Moon | G09B 21/004 | |
| 10,269,264 B2 * | 4/2019 | Azamfar | G09B 21/004 | |
| 10,322,336 B2 * | 6/2019 | Tran | A63F 9/0001 | |
| 10,339,832 B2 * | 7/2019 | Abebe | G09B 21/004 | |
| 10,384,137 B2 * | 8/2019 | Tran | A63F 13/87 | |
| 10,424,223 B2 * | 9/2019 | Lee | G09B 21/00 | |
| 10,431,118 B2 * | 10/2019 | Shah | G09B 21/004 | |
| 10,438,107 B1 * | 10/2019 | Gamboa | G09B 21/004 | |
| 10,446,058 B2 * | 10/2019 | Collins, Jr. | G06F 3/016 | |
| 10,453,359 B2 * | 10/2019 | Kim | H04M 1/0202 | |
| 10,463,978 B2 * | 11/2019 | Tran | G09B 21/004 | |
| 10,521,046 B2 * | 12/2019 | Klein | H04L 9/3231 | |
| 10,540,909 B2 * | 1/2020 | Murphy | G09B 21/02 | |
| 10,573,199 B2 * | 2/2020 | Abebe | G09B 21/02 | |
| 10,601,980 B1 * | 3/2020 | Engelke | G10L 15/26 | |
| 10,692,400 B2 * | 6/2020 | Drake | G09B 21/004 | |
| 10,733,906 B2 * | 8/2020 | Pascall | H01F 7/081 | |
| 10,733,907 B2 * | 8/2020 | Chen | G09B 21/004 | |
| 10,755,159 B1 * | 8/2020 | Gamboa | G09B 21/003 | |
| 10,841,438 B2 * | 11/2020 | Tanaka | G06F 1/3206 | |
| 10,845,882 B2 * | 11/2020 | Jung | G09B 21/005 | |
| 10,847,056 B2 * | 11/2020 | Lau | G06F 1/1632 | |
| 10,866,643 B2 * | 12/2020 | Cho | G06F 3/04895 | |
| 10,891,051 B2 * | 1/2021 | Klein | G06F 1/1692 | |
| 10,909,882 B2 * | 2/2021 | Kim | G09B 21/004 | |
| 10,970,608 B1 * | 4/2021 | Gamboa | G09B 21/004 | |
| 11,011,076 B2 * | 5/2021 | Seo | G06F 3/016 | |
| 11,062,623 B2 * | 7/2021 | Murphy | G06F 3/016 | |
| 11,120,706 B2 * | 9/2021 | Khermayer | G09B 21/005 | |
| 11,145,223 B2 * | 10/2021 | Californiaa | G09B 21/007 | |
| 11,164,480 B2 * | 11/2021 | Guenther | G09B 21/004 | |
| 11,189,194 B2 * | 11/2021 | Li | G09B 21/004 | |
| 11,200,815 B2 * | 12/2021 | White | G09B 21/004 | |
| 11,210,960 B2 * | 12/2021 | Treml | G09B 1/18 | |
| 11,275,444 B2 * | 3/2022 | Yun | G05D 1/02 | |
| 11,295,632 B2 * | 4/2022 | Greiner | G09F 9/375 | |
| 11,335,207 B2 * | 5/2022 | Cohen | G09B 21/004 | |
| 11,355,034 B2 * | 6/2022 | Gutmann | G09B 21/007 | |
| 11,360,561 B2 * | 6/2022 | Richter | G06F 3/011 | |
| 11,373,547 B2 * | 6/2022 | Jung | G09B 21/004 | |
| 11,373,548 B2 * | 6/2022 | Drake | G09B 21/003 | |
| 11,410,574 B2 * | 8/2022 | Yang | G09B 21/004 | |
| 11,436,942 B2 * | 9/2022 | Shao | G06F 18/00 | |
| 11,436,943 B2 * | 9/2022 | Pitts | G09B 21/004 | |
| 11,455,910 B2 * | 9/2022 | Bailey | G09B 21/02 | |
| 11,475,793 B2 * | 10/2022 | Californiaa | G10L 13/00 | |
| 11,514,817 B2 * | 11/2022 | Shaikh | G09B 21/007 | |
| 11,521,514 B2 * | 12/2022 | Kolar | G09B 21/004 | |
| 11,532,243 B2 * | 12/2022 | Conard | G09B 21/004 | |
| 11,538,359 B2 * | 12/2022 | Seo | G09B 1/30 | |
| 11,538,360 B2 * | 12/2022 | Moon | G06F 16/381 | |
| 11,551,576 B2 * | 1/2023 | Young | G09B 21/004 | |
| 11,574,559 B2 * | 2/2023 | Cohen | G09B 21/003 | |
| 11,625,105 B2 * | 4/2023 | Litschel | G10L 13/02 | 345/169 |
| 11,625,145 B2 * | 4/2023 | Van Wiemeersch | B60K 37/06 | 715/810 |
| 11,636,780 B2 * | 4/2023 | Keller | G09B 21/003 | 434/113 |
| 11,640,769 B2 * | 5/2023 | Ayana | G09B 21/004 | 434/114 |
| 11,645,948 B2 * | 5/2023 | Moon | G09B 21/004 | 434/114 |
| 11,657,248 B1 * | 5/2023 | Gamboa | G06K 19/18 | 235/492 |
| 11,715,389 B2 * | 8/2023 | Murphy | G09B 21/02 | 434/114 |
| 11,726,571 B2 * | 8/2023 | Mani | G06F 3/0346 | 345/173 |
| 11,727,825 B2 * | 8/2023 | Seo | G09B 21/004 | |
| 2004/0175677 A1 * | 9/2004 | Koch | G09B 21/004 | 434/113 |
| 2004/0197745 A1 * | 10/2004 | Hong | G09B 21/004 | 434/113 |

(56) References Cited

U.S. PATENT DOCUMENTS

| | | | |
|---|---|---|---|
| 2004/0202499 A1* | 10/2004 | Yang | G09B 21/004 434/114 |
| 2006/0280294 A1 | 12/2006 | Zhang | |
| 2007/0020589 A1* | 1/2007 | Smith | G09B 21/003 434/113 |
| 2007/0190500 A1* | 8/2007 | Uemitsu | G09B 21/004 434/113 |
| 2009/0011391 A1* | 1/2009 | Van Hees | G09B 21/004 340/407.1 |
| 2010/0159423 A1* | 6/2010 | Hashizume | G09B 21/004 434/114 |
| 2011/0111375 A1* | 5/2011 | Luu | G09B 21/004 434/114 |
| 2012/0218193 A1* | 8/2012 | Weber | G09B 21/004 345/173 |
| 2012/0236134 A1* | 9/2012 | Keyes | G09B 21/004 348/E7.085 |
| 2012/0295232 A1 | 11/2012 | Lim | |
| 2013/0017516 A1* | 1/2013 | Tyler | G04B 25/02 434/114 |
| 2013/0029297 A1* | 1/2013 | Tsai | G09B 21/003 434/114 |
| 2013/0203022 A1* | 8/2013 | Al-Qudsi | G09B 21/004 434/113 |
| 2014/0356819 A1* | 12/2014 | Rodriguez Regalado | G09B 21/004 434/114 |
| 2015/0091834 A1* | 4/2015 | Johnson | G09B 21/003 345/173 |
| 2015/0154885 A1* | 6/2015 | Livermore-Clifford | G09B 21/003 29/25.35 |
| 2015/0154886 A1* | 6/2015 | Aldossary | G09B 21/004 434/114 |
| 2015/0310766 A1* | 10/2015 | Alshehri | G09B 21/003 434/114 |
| 2016/0293050 A1* | 10/2016 | Wang | G09B 21/004 |
| 2017/0116884 A1* | 4/2017 | Choi | G06F 3/016 |
| 2017/0193855 A1* | 7/2017 | Yang | G09B 21/004 |
| 2017/0316717 A1* | 11/2017 | Aly | G06F 3/0416 |
| 2018/0190151 A1* | 7/2018 | Seo | G09B 21/003 |
| 2018/0190152 A1* | 7/2018 | Seo | G09B 21/004 |
| 2018/0240363 A1* | 8/2018 | Vats | G06F 1/1637 |
| 2018/0315342 A1* | 11/2018 | Chari | G09B 21/004 |
| 2018/0373333 A1* | 12/2018 | Park | G06F 3/0486 |
| 2019/0072402 A1* | 3/2019 | Stanley | G01C 21/36 |
| 2019/0236120 A1* | 8/2019 | Reid | G06F 15/025 |
| 2019/0266917 A1* | 8/2019 | Madolell Domenech | G06F 3/041 |
| 2020/0082737 A1* | 3/2020 | Kobayashi | G06F 3/041 |
| 2020/0090547 A1* | 3/2020 | Kim | G09B 21/003 |
| 2020/0168121 A1* | 5/2020 | Aly | G06F 3/016 |
| 2020/0265752 A1* | 8/2020 | Sun | G07F 19/201 |
| 2020/0294419 A1* | 9/2020 | Belomoev | H04W 4/80 |
| 2021/0089206 A1* | 3/2021 | Klein | H04L 9/3231 |
| 2021/0295739 A1* | 9/2021 | Moon | G09B 21/004 |
| 2021/0358331 A1* | 11/2021 | Kim | G09B 21/004 |
| 2021/0366309 A1 | 11/2021 | Kolar et al. | |
| 2021/0375158 A1 | 12/2021 | Ayana | |
| 2021/0398452 A1* | 12/2021 | Californiaa | G09B 21/004 |
| 2022/0148457 A1* | 5/2022 | Takaoka | G06K 19/06131 |
| 2022/0327960 A1* | 10/2022 | Drake | G09B 21/003 |
| 2022/0375366 A1* | 11/2022 | Karpelson | G09B 21/008 |
| 2023/0031754 A1* | 2/2023 | Chen | G09B 21/004 |
| 2023/0252911 A1* | 8/2023 | Conard | G09B 21/004 434/113 |
| 2023/0298483 A1* | 9/2023 | Ayana | G09B 21/004 434/114 |
| 2023/0335007 A1* | 10/2023 | Conard | G09B 21/005 |
| 2023/0335008 A1* | 10/2023 | Moon | G09B 21/004 |
| 2023/0341943 A1* | 10/2023 | Mani | G09B 21/007 |
| 2023/0360559 A1* | 11/2023 | Chari | G09B 21/004 |
| 2023/0368700 A1* | 11/2023 | Lubiner | G09B 21/004 |

* cited by examiner

|  | First Region 900 | Second Region 902 | Third Region 904 | Region 906 |
|---|---|---|---|---|
| Time 1 908 | Character 1 920 | | | |
| Time 2 910 | Character 2 922 | Character 1 920 | | |
| Time 3 912 | Character 3 924 | Character 2 922 | Character 1 920 | |
| Time 4 914 | Character 4 926 | Character 3 924 | Character 2 922 | Character 1 920 |
| Time 5 916 | Character 5 928 | Character 4 926 | Character 3 924 | Character 2 922 |
| Time 6 918 | Character 6 930 | Character 5 928 | Character 4 926 | Character 3 924 |
| ⋮ | ⋮ | ⋮ | ⋮ | ⋮ |

MODULAR REFRESHABLE BRAILLE DISPLAY SYSTEM

CROSS-REFERENCE TO RELATED APPLICATIONS

This application claims priority to, and the benefit of, U.S. application Ser. No. 17/330,669, filed May 26, 2021, titled "MODULAR REFRESHABLE BRAILLE DISPLAY SYSTEM," which claims priority to Provisional Application No. 63/031,693, filed May 29, 2020 titled "MODULAR REFRESHABLE BRAILLE DISPLAY SYSTEM", the entireties of which are incorporated herein by reference.

TECHNICAL FIELD

This document generally describes apparatuses, systems, and methods for assistive technology, such as braille systems.

BACKGROUND

Braille is a tactile reading and writing system to assist the blind. Braille uses raised dots to represent alphabetical letters and symbols. These dots can be engraved on various materials. Blind people move their fingers over reading areas in order to read the raised braille dots. Some braille systems include refreshable braille displays, which are electro-mechanical devices for displaying braille characters. Some refreshable braille displays can be in wired communication with a device, such as a computer, and can include braille dots that are raised and lowered to assist the blind in reading information displayed on the device. Some refreshable braille displays can be expensive.

SUMMARY

This document generally describes apparatuses, systems, and methods for assistive technology, such as braille systems. In particular, the apparatus described herein can be a refreshable braille display system that is affordable and easy to service for legally blind people, users who want to learn to read braille or improve their braille literacy, and/or businesses. The technology described herein can provide simple structures that are portable and can be easily adapted to various types of devices that users want to interact with. For example, the refreshable braille display system can be implemented in a case for a mobile device (e.g., smartphone, tablet, laptop, etc.) to assist blind people in reading braille while also interacting with their mobile device. In some implementations, the refreshable braille display system can be installed in and/or in wireless communication with devices in public locations, such as mall kiosks, ATMs, and transit stations. The system described herein can assist blind people in their ability to read information that dynamically changes while they are interacting in public spaces. In some implementations, the apparatus described herein can be used to teach users to read and understand braille and improve their braille literacy.

The apparatus described herein can include a first base having a bar magnet housed in a housing and a detachable top housing containing various coils (e.g., solenoids) wrapped around braille pins and uniquely powered through a circuit. Use of the bar magnet can reduce a frequency of servicing one or more components of the system described herein since the magnet provides a strong and long-lasting magnetic field. The coils and braille pins can each be housed in cylinders (e.g., cavities) having openings on an upper surface of the top housing. The braille pins housed within each of the cylinders can be actuated by sending currents to the coils so as to extend the pins through the openings. In some implementations, the braille pins can maintain an attractive force to the bar magnet so long as no current is passed through the coils. As a result, the braille pins remain lowered within the cylinder. When current is passed through the coils, a repulsion force forms between the braille pins and the bar magnet, thereby pushing the braille pins up through the opening. The user can sense the braille pin(s) moving beneath their fingers and read the braille. In some implementations, the current can be modulated to restrict the pins from extending indefinitely through the opening, which reduces the potential that one or more components of the system malfunction and require servicing or maintenance. Because current is only used to extend pins through the openings and not to also maintain pins in a lowered position, the system uses less power/energy and a power source that supplies currents to one or more components of the system requires less frequent servicing and/or replacement.

The first base can also include one or more connectors to facilitate coupling the first base with additional housings, such as a second base. This modular design makes the servicing and/or maintenance of system components more efficient and easier. The second base can house a controller, power source, and battery. These components can be in wired communication with one or more components of the first base, such as the coils. The controller can be configured to determine when current is sent to one or more coils to uniquely actuate the associated braille pins. The controller can adjust the timing of current that is sent to each coil so that the braille pins can be selectively actuated at optimal times and/or speeds for users. A user can adjust a speed at which the braille pins are extend, thereby permitting the user to read the braille characters at a pace comfortable and suitable for them. Additionally, the user can adjust how braille characters are displayed (e.g., at different time intervals, all at once, repeated characters, etc.). Having the ability to customize the refreshable braille display system described herein can benefit the user in improving their braille literacy, learning braille, and/or reading braille in their normal day-to-day life.

In some implementations, the system described herein can be attached to a smartphone or other mobile device. Using BLUETOOTH or other wireless communication, information that is displayed at the mobile device can be communicated to the controller and converted into braille characters. Alternatively, a wired communication can be used to permit the system to communicate with the mobile device. The controller can determine whether to transmit currents to one or more coils in order to raise the braille pins associated with the converted braille characters. When the system is part of a case that encloses the mobile device (e.g., a smartphone case), the user can easily read the braille characters using one hand. The user can hold the device as one normally would and maintain their fingers in a static position alongside a side of the case. The reading area may be on the side of the case, so the user does not need to move their fingers in order to read braille characters as they are displayed. In some implementations, the braille characters can be displayed one at a time in the reading area while the user maintains their fingers in a static position over/on the reading area. In other implementations, the braille characters can be displayed at the same time in the reading area while the user maintains their fingers in a static position over/on the reading area. Additionally, as the user holds the device with the hand that is also reading the braille characters, the user can use their other hand to interact with the mobile device. The user can also interact with voice-over technology to control the mobile device while also reading the associated braille. This seamless integration makes it faster and easier for the user to use their mobile device and read braille at the same time instead of having to do one task at a time.

One or more embodiments described herein can include an apparatus for refreshable braille display. The apparatus can include a first base including a contact surface and a plurality of cavities, the contact surface configured to receive fingertips, the plurality of cavities being recessed from the contact surface, a plurality of pins housed within the plurality of cavities and configured to move in the plurality of cavities to selectively extend from the contact surface of the first base, a plurality of solenoids configured to at least partially operably connect to the plurality of pins, and a controller configured to selectively provide a first electric current to the plurality of solenoids to generate first magnetic fields through the plurality of solenoids. The first magnetic fields can selectively move the plurality of pins to extend from the contact surface of the first base.

The embodiments described herein can optionally include one or more of the following features. For example, the apparatus can also include a magnet disposed in the first base. The magnet can generate an attractive force relative to the plurality of pins such that the plurality of pins are biased into the cavities. The first magnetic fields can create repulsion forces between the plurality of pins and the magnet, the repulsion forces can cause the plurality of pins to extend from the contact surface of the first base.

As another example, the controller can selectively provide a second electric current to the plurality of solenoids to generate second magnetic fields through the plurality of solenoids, the second magnetic fields can selectively move the plurality of pins into the cavities. Moreover, one or more of the cavities can be removable from the first base. The plurality of solenoids can include coils wrapped around the pins. The plurality of coils can be made of a material including iron.

As yet another example, the apparatus can also include a second base configured to house the controller and attach to the first base, and one or more connectors extending from the first base and configured to engage with the second base to attach the first base to the second base. The one or more connectors can include conductive wires configured to externally connect the controller to the plurality of solenoids. The one or more connectors can also include conductive wires configured to electrically connect the controller to the plurality of solenoids. The conductive wires of the one or more connectors can be made of a material including copper.

Moreover, the contact surface of the first base can include a plurality of contact units, each contact unit including one or more of the plurality of cavities and configured to permit for a fingertip to contact. The contact surface of the first base can permit for multiple fingertips to simultaneously contact the plurality of contact units, respectively. Each of the plurality of contact units of the first base can include at least six cavities.

The first base can attach to a device having a display and the first base can communicate with the device, the device being at least one of a computer, a smartphone, or a kiosk. In some implementations, the first base can be integrated into a wearable device to be worn around a wrist of a user. In yet some implementations, the first base can be integrated into right and left sides of a smartphone case and the smartphone case can include adjustable side mounts that extend out from the right and left sides of the smartphone case, the adjustable side mounts configured to expand to a width of a smartphone and to retain the smartphone in the smartphone case. Sometimes, the first base can communicate with a device, the device being at least one of a computer, a smartphone, or a kiosk.

In some implementations, the controller can further be configured to receive text data from a computing device, convert the text data into braille character data, based on the braille character data, identify a subset of the plurality of pins or a subset of the plurality of solenoids that receives the subset of the plurality of pins, wherein the subset of the plurality of pins represents one or more braille characters corresponding to the text data, and transmit the first electric current to the subset of the plurality of solenoids such that the subset of the plurality of pins moves to extend from the contact surface of the first base.

Moreover, the contact surface of the first base can permit for multiple fingertips to simultaneously contact the plurality of contact units, respectively. The plurality of contact units can include a first contact unit and a second contact unit. The controller can also receive first text data from a computing device, convert the first text data into first braille character data, based on the first braille character data, identify a first subset of the plurality of pins in the first contact unit, or a first subset of the plurality of solenoids that receives the first subset of the plurality of pins in the first contact unit, wherein the first subset of the plurality pins represents a first braille character corresponding to the first text data, and transmit the first electric current to the first subset of the plurality of solenoids such that, at a first time, the first subset of the plurality of pins moves to extend from the first contact unit of the first base.

In some implementations, the controller can also, based on the first braille character data, identify a second subset of the plurality of pins in the second contact unit, or a second subset of the plurality of solenoids that receives the second subset of the plurality of pins in the second contact unit, wherein the second subset of the plurality pins represents the first braille character corresponding to the first text data, and transmit the first electric current to the second subset of the plurality of solenoids such that, at a second time later than the first time, the second subset of the plurality of pins moves to extend from the first contact unit of the first base, wherein the second subset of the plurality of pins in the second contact unit is positioned identically to the first subset of the plurality of pins in the first contact unit. As another example, the first subset of the plurality of pins in the first contact unit is positioned identically to the second subset of the plurality of pins in the second contact unit.

The controller can also receive second text data from the computing device, convert the second text data into second braille character data, based on the second braille character data, identify a third subset of the plurality of pins in the first contact unit, or a third subset of the plurality of solenoids that receives the third subset of the plurality of pins in the first contact unit, wherein the third subset of the plurality pins represents a second braille character corresponding to the second text data, and transmit the first electric current to the third subset of the plurality of solenoids such that, at a third time, the third subset of the plurality of pins moves to extend from the first contact unit of the first base. In some implementations, the third time can be (i) identical to the second time, (ii) later than the second time, or (iii) earlier than the second time and later than the first time. The third time can also be later than the second time. The third time can also be earlier than the second time and later than the first time.

In some implementations, the controller can also receive second text data from the computing device, convert the second text data into second braille character data, based on the second braille character data, identify a fourth subset of the plurality of pins in the second contact unit, or a fourth subset of the plurality of solenoids that receives the fourth subset of the plurality of pins in the first contact unit, wherein the fourth subset of the plurality pins represents a second braille character corresponding to the second text data, and transmit the first electric current to the fourth subset of the plurality of solenoids such that, at the first time, the fourth subset of the plurality of pins moves to extend from the second contact unit of the first base.

One or more embodiments described herein can also include an apparatus for refreshable braille display. The apparatus can include a first base including a contact surface and a plurality of cavities, the contact surface configured to receive fingertips, the plurality of cavities being recessed from the contact surface, a plurality of contact units attached to the contact surface and arranged side by side, wherein each contact unit includes at least six of the plurality of cavities, and wherein each of the plurality of contact units are configured to be removable from the contact surface of the first base, a plurality of pins housed within the plurality of cavities and configured to move in the plurality of cavities to selectively extend from the contact surface of the first base, a plurality of solenoids configured to at least partially operably connect to the plurality of pins, and a controller configured to selectively provide a first electric current to the plurality of solenoids to generate first magnetic fields through the plurality of solenoids, wherein the first magnetic fields are configured to selectively move the plurality of pins to extend from the contact surface of the first base.

The embodiments described herein can include one or more of the following features. For example, the plurality of contact units can include a first contact unit and a second contact unit. The controller can be configured to receive first text data from a computing device, convert the first text data into first braille character data, based on the first braille character data, identify a first subset of the plurality of pins in the first contact unit, or a first subset of the plurality of solenoids that receives the first subset of the plurality of pins in the first contact unit, wherein the first subset of the plurality pins represents a first braille character corresponding to the first text data, and transmit the first electric current to the first subset of the plurality of solenoids such that, at a first time, the first subset of the plurality of pins moves to extend from the first contact unit of the first base.

In some implementations, the controller can based on the first braille character data, identify a second subset of the plurality of pins in the second contact unit, or a second subset of the plurality of solenoids that receives the second subset of the plurality of pins in the second contact unit, wherein the second subset of the plurality pins represents the first braille character corresponding to the first text data, and transmit the first electric current to the second subset of the plurality of solenoids such that, at a second time later than the first time, the second subset of the plurality of pins moves to extend from the first contact unit of the first base. The first subset of the plurality of pins in the first contact unit can be positioned identically to the second subset of the plurality of pins in the second contact unit.

In yet some implementations, the controller can receive second text data from the computing device, convert the second text data into second braille character data, based on the second braille character data, identify a third subset of the plurality of pins in the first contact unit, or a third subset of the plurality of solenoids that receives the third subset of the plurality of pins in the first contact unit, wherein the third subset of the plurality pins represents a second braille character corresponding to the second text data, and transmit the first electric current to the third subset of the plurality of solenoids such that, at a third time, the third subset of the plurality of pins moves to extend from the first contact unit of the first base.

Moreover, the third time can be identical to the second time. The third time can be later than the second time. The third time can be earlier than the second time and later than the first time. In yet some implementations, the controller can receive second text data from the computing device, convert the second text data into second braille character data, based on the second braille character data, identify a fourth subset of the plurality of pins in the second contact unit, or a fourth subset of the plurality of solenoids that receives the fourth subset of the plurality of pins in the first contact unit, wherein the fourth subset of the plurality pins represents a second braille character corresponding to the second text data, and transmit the first electric current to the fourth subset of the plurality of solenoids such that, at the first time, the fourth subset of the plurality of pins moves to extend from the second contact unit of the first base.

One or more advantages can be apparent from the disclosure herein. For example, the refreshable braille display system described herein can be more affordable because the coils can be made from solenoids. The solenoids may not use piezo-electric materials, such as ceramics, which means the solenoids can be less expensive to implement, service, and/or maintain. Solenoid actuators can also operate efficiently with small current. Solenoid actuators can be scaled down to small structures and can be less expensive to custom manufacture. For the purpose of creating a portable refreshable braille display, as described herein, solenoids can provide more energy, space, and a cost-effective option. The solenoids can be made from ferromagnetic materials like iron. An iron core can be preferred due to its ease to obtain and manufacture lower cost of manufacturing. Additionally, the iron core can be advantageous because of its high magnetic permeability, which permits the solenoid to have a stronger reaction to a bar magnet and the solenoid's generated magnetic field. Moreover, covering the solenoids with copper coils can cause the iron core to act as an electromagnet. The solenoids can be pushed by the bar magnet when current is passed through and pulled when current is absent. This configuration can help simulate braille pin movement. Applying current to the solenoids only when the braille pin should be raised can be advantageous to reduce an amount of power/voltage that is required to operate the system described herein. This can reduce frequency of servicing/replacing components such as the battery or other power source.

As another example, the apparatus described herein can be easily adaptable to cases for different types of mobile devices, including smartphones, tablets, laptops, and/or kiosks in public locations, such as transit stations, malls, grocery stores, and banks. For example, the disclosed apparatus and technology can be applied to smartphone cases. One or more smartphone cases can be made to fit particular types of smartphones. One or more smartphone cases can also be adjustable to accommodate for a variety of differently sized smartphones. As another example, the disclosed apparatus and technology can be applied to wearable devices, such as bracelets and smart watches. Thus, a user can read information in Braille on the wearable device by placing their fingertips on top of braille reading area on the wearable device that is worn around their wrist. Using the wearable device, the user can read information that is processed or presented at the user's mobile device as well as check time and biometric measurements of the user (e.g., heartrate, respiration rate, etc.). The disclosed apparatus and technology can also be applied to a computer mouse, such that a user can navigate their computer and read information in braille as it is presented at a display of the computer. This ease of adaptability can improve the ability of legally blind users to interact with their surroundings and continue normal day-to-day activities. Additionally, the ease of adaptability can make it easier for users to learn how to read braille and/or to improve their braille literacy. Accordingly, the apparatus described herein can be used as a versatile teaching tool.

As another example, the apparatus can have a small form factor. Some implementations of the apparatus described herein can be carried around by users such that the users can attach it to any compatible device the users intend to use. For example, merely installing software on the compatible device and establishing a communication (e.g., wired and/or wireless) between the apparatus and the compatible device can provide for ease of interaction for the user.

Moreover, the apparatus can include easily replaceable and detachable modular components. The first and second bases can be easily detachable from each other such that one or more components can be individually serviced and/or replaced. The bar magnet can be more efficiently removed from its housing and replaced should servicing be required. The battery in the second base can easily be replaced by detaching the first and second bases. Additionally, any one of the coils and/or braille pins can be replaced or serviced. In some implementations, as with the wearable device mentioned above, the apparatus can be charged using wireless charging. As a result, a battery, for example, may not need to be replaced.

As another example, the apparatus can include a minimum number of braille pins needed to display a braille character. Replacement and maintenance of such pins can therefore be easier and faster. The user can replace a singular pin, coil, and/or cylinder housing the coil and pin rather than having to replace an entire unit of braille pins or all the pins in the reading area, which can be more costly and timely. The reading area of the small form factor apparatus (e.g., the apparatus incorporated in a smartphone case) can typically be smaller than the average reading area, so maintaining fewer braille pins in the reading area can be less expensive, easier and more efficient to service, and also easier and faster for the user to read. The smaller form factor also makes it easier to apply the apparatus to different devices, as described above. More so, the smaller form factor can make it easier for the user to read because they may not have to move their fingertips over and/or across a reading area. Instead, the user may keep their fingertips in one position (e.g., on a side of a smartphone case in a normal manner in which the user holds their smartphone). In that position, the user can hold their smartphone, for example, as well as read information in braille as it is presented on a display of the smartphone.

As yet another example, the apparatus described herein can provide for easier and faster reading of braille. The user merely positions at least one finger on top of the reading area. The user may not have to move their fingers to read the braille characters. Braille pins can be actuated in such a way to simulate the reading process. The pins can continuously move beneath the user's static fingers in order to replicate each braille character associated with a string of text. The pins can also be actuated so as to repeat braille characters before displaying other braille characters, which can be advantageous to assist the user in learning how to read braille. The user can also customize how braille characters are displayed (e.g., time intervals between each character, speed at which characters are displayed, etc.) based on the user's braille literacy and/or desire to learn how to read braille. This configuration is also advantageous to permit the user ease of reading braille while interacting with their mobile device at the same time.

Moreover, the apparatus described herein can be made of aluminum or similar material. This type of material can be advantageous to make the apparatus durable. Increased durability can reduce a need for maintenance and/or repairs to components of the disclosed apparatus. Additionally, the apparatus can include silicone gel or similar plastic material features to improve comfortability for the user. For example, a smartphone case having the disclosed apparatus can include silicone gel material around a braille reading area. This material can be textured (e.g., ribbed). This material can provide for better grip for the user. This material can also improve an aesthetic appearance of the disclosed apparatus when used with devices such as smartphone and wearable devices.

The details of one or more embodiments are set forth in the accompanying drawings and the description below. Other features and advantages will be apparent from the description and drawings, and from the claims.

DETAILED DESCRIPTION

This document generally describes apparatuses and methods for assistive technology, namely a modular refreshable braille display system.

Figure 1:
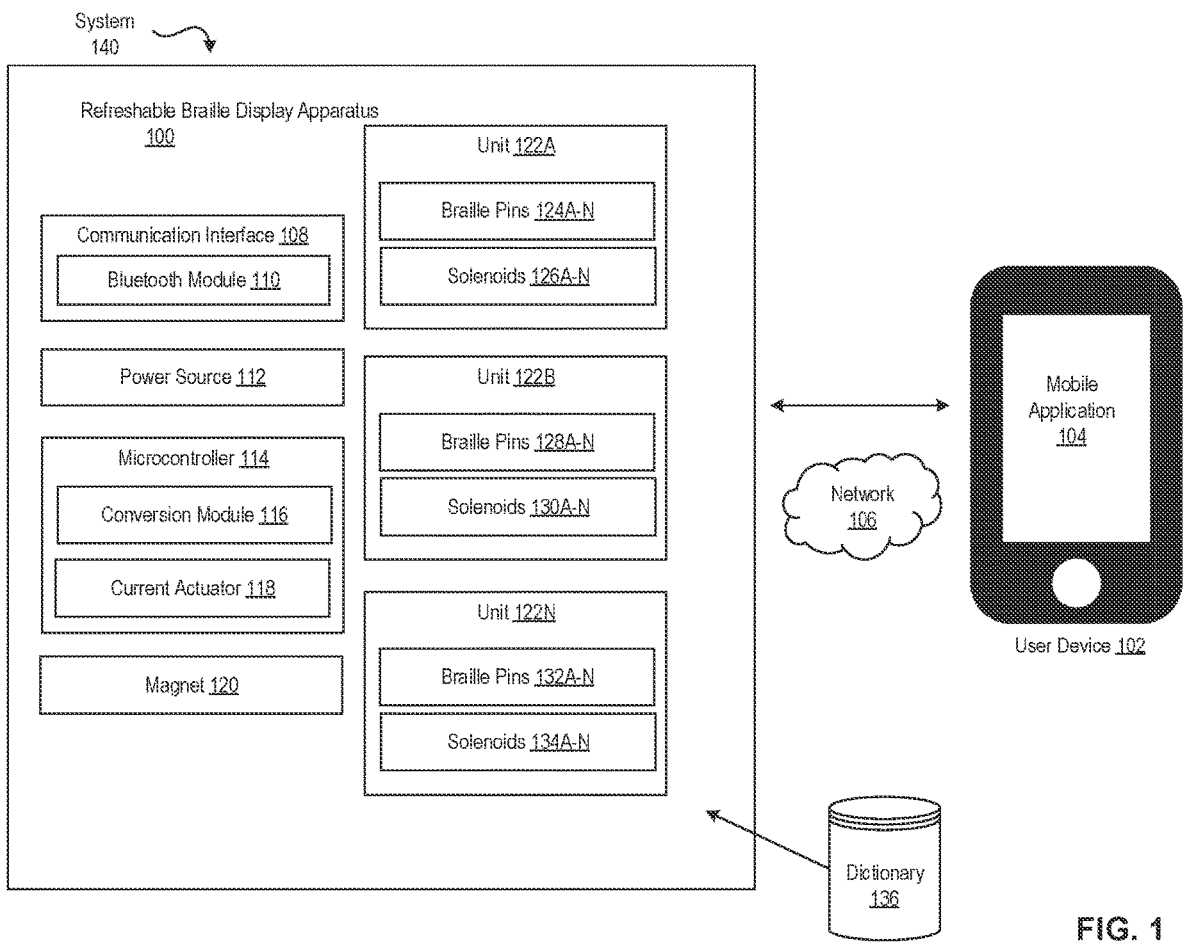
FIG. 1 depicts an exemplary refreshable braille display system described herein.

FIG. 1 depicts an exemplary refreshable braille display apparatus 100 described herein. System 140 can include the apparatus 100, a user device 102, and a network 106. The refreshable braille display apparatus 100 can include a communication interface 108, a power source 112, a microcontroller 114, a magnet 120, and one or more units 122A-N (e.g., contact units). The apparatus 100 can be in communication with the user device 102 (e.g., computing device). The communication can be wireless, such as via BLUETOOTH technology. In other implementations, the communication can be through WIFI or a cellular network. The apparatus 100 and the user device 102 can communicate via the network 106.

The user device 102 can include a mobile application 104. The mobile application 104 can connect the user device 102 to the apparatus 100 via a BLUETOOTH connection. Text data displayed at the user device 102 can be transmitted to the microcontroller 114 so that the text data can be converted to braille character data, and used by the apparatus 100 in order to actuate one or more braille pins (e.g., refer to FIG. 11). The mobile application 104 can be configured to read existing APIs associated with different systems or applications on the user device 102, such as a device operating system, a banking application, a messaging application, a web browser, etc., so that it can communicate text data associated with those systems or applications to the microcontroller 114. As a result, the apparatus 100 can translate into braille character data text data that originate from various sources (e.g., applications, systems, etc.) in the user device 102 and is displayed at the user device 102. In some implementations, the user can also use voice-over technologies to navigate applications and systems on the user device 102. Text data displayed as a result of using the voice-over technologies can be transmitted to the microcontroller 114 and converted into readable braille character data. This is advantageous because the user can seamlessly interact with various applications or systems on the user device 102 while also reading braille character data that is displayed by the apparatus 100.

The mobile application 104 can be used by a user at the user device 102 to customize one or more settings of the apparatus 100. In some implementations, the user can use the mobile application 104 to pair and/or connect the user device 102 with the refreshable braille display apparatus 100. For example, the user can use the mobile application 104 to adjust a speed at which braille pins are actuated at the apparatus 100. As a result, the user can adjust how quickly braille character data is displayed and how quickly the user reads the braille character data. Adjusting various settings of the apparatus 100 by using the mobile application 104 can help the user improve their braille literacy and/or learn how to read braille.

The user can also use the mobile application 104 to test and/or troubleshoot one or more components of the apparatus 100. For example, in some implementations, the mobile application 104 can generate a set of test text data and transmit it to the apparatus 100. The apparatus 100 can then convert the test text data into braille character data and provide currents to one or more units of braille pins to actuate the braille pins in accordance with the braille character data. The user can then read the raised braille pins to determine whether the pins accurately display the braille character data and the corresponding test text data. In yet other implementations, the user can receive notifications at the mobile application 104 when the apparatus 100 is disconnected from the user device 102 and/or when one or more components of the apparatus 100 require servicing and/or maintenance. For example, if the power source 112 (e.g., a battery) needs to be replaced, the user can receive a notification at the mobile application 104. The user at the mobile application 104 can also receive a notification when one or more braille pins and/or solenoids need to be replaced.

Still referring to the refreshable braille display apparatus 100, the communication interface 108 is configured to transmit information, such as text data displayed at the user device 102, to the apparatus 100. The communication interface 108 can include a wireless communication module 110 and a wired communication module 111. The wireless communication module 110 can be configured to facilitate wireless communication/connectivity with the user device 102. Example of such wireless communication can include BLUETOOTH communication. Alternatively, the wired communication module 111 can permit wired connection and communication between the apparatus 100 and the user device 102.

The power source 112 is configured to supply electric power to the components of the apparatus 100. Examples of the power source 112 can include a battery. In some implementations, the apparatus 100 can be in wired communication with an external power source, such as a battery of the user device 102 or electrical outlets of various types (e.g., AC mains, USB ports, etc.).

The microcontroller 114 can include a conversion module 116 and a current actuator 118. The conversion module 116 can be configured to receive text data from the user device 102 and convert the text data into braille character data (e.g., refer to FIG. 11). The conversion module 116 can be in communication with a dictionary database 136 in order to determine accurate conversions of the text data into the braille character data. The current actuator 118 can be configured to determine whether a current should be transmitted to one or more units 122A-N and/or braille pins in the units (as further described herein). This determination can be based, at least in part, on the braille character data. The braille character data can include information about which braille pins needs to be raised for a user to read braille characters that are identified by the braille character data associated with the text data. In some implementations, the current actuator 118 can also determine an amount of current that needs to be supplied to one or more of the units and/or the braille pins in the units.

The apparatus 100 further includes at least one magnet 120 (e.g., bar magnet). One or more braille pins can be attracted to the magnet 120 by an attractive force, thereby causing the one or more braille pins to remain lowered, as described further herein. One bar magnet 120 can be advantageous to reduce frequency and cost of servicing or replacing the magnet 120. In some implementations, the apparatus 100 can include more than one magnet. For example, each of the units 122A-N can include a bar magnet in order to improve versatility. Having more than one bar magnet can be advantageous where the apparatus 100 attaches to a large user device, such as a laptop or kiosk that has a larger reading area with more units of braille pins.

Still referring to the apparatus 100, each unit 122 (e.g., 122A. 122B ... 122N) can have one or more braille pins and one or more solenoids. For example, the unit 122A can include one or more braille pins 124A-N and one or more solenoids 126A-N. The unit 122B can include one or more braille pins 128A-N and one or more solenoids 130A-N. The unit 122N can include one or more braille pins 132A-N and one or more solenoids 134A-N. In some implementations, each of the units 122A-N can include six braille pins 124A-N. 128A-N, and 132A-N, respectively (e.g., refer to FIG. 3). Six braille pins can be a minimum number of pins to display a braille character. In other implementations, fewer or more than six braille pins can be used in each unit 122. Fewer pins can allow less frequent and less costly servicing. Fewer pins also makes it easier to service and/or replace individual pins.

In other implementations, one or more of the units 122A-N can include eight braille pins 124A-N. 128A-N. and 132A-N, respectively. In some implementations, the refreshable braille display apparatus 100 can be manufactured and configured with a predetermined number of units 122A-N, each having six braille pins. For example, the apparatus can include four units 122A-N, each having six braille pins, totaling 24 pins. In other implementations, a user can customize their apparatus 100 to include as many units 122A-N and/or how many braille pins 124A-N. 128A-N. and 132A-N per unit. This customization can be limited by a size of a reading area on the refreshable braille display apparatus 100. For example, an apparatus 100 configured as a smartphone can have a smaller reading area than an apparatus 100 configured as a case for a laptop or tablet having a larger reading area. In some implementations, the user may prefer having more than six braille pins per unit (e.g., eight braille pins) in order to experience more ease in reading braille. This configuration can be beneficial for users who are learning to read braille and/or improving their braille literacy.

Figure 5:
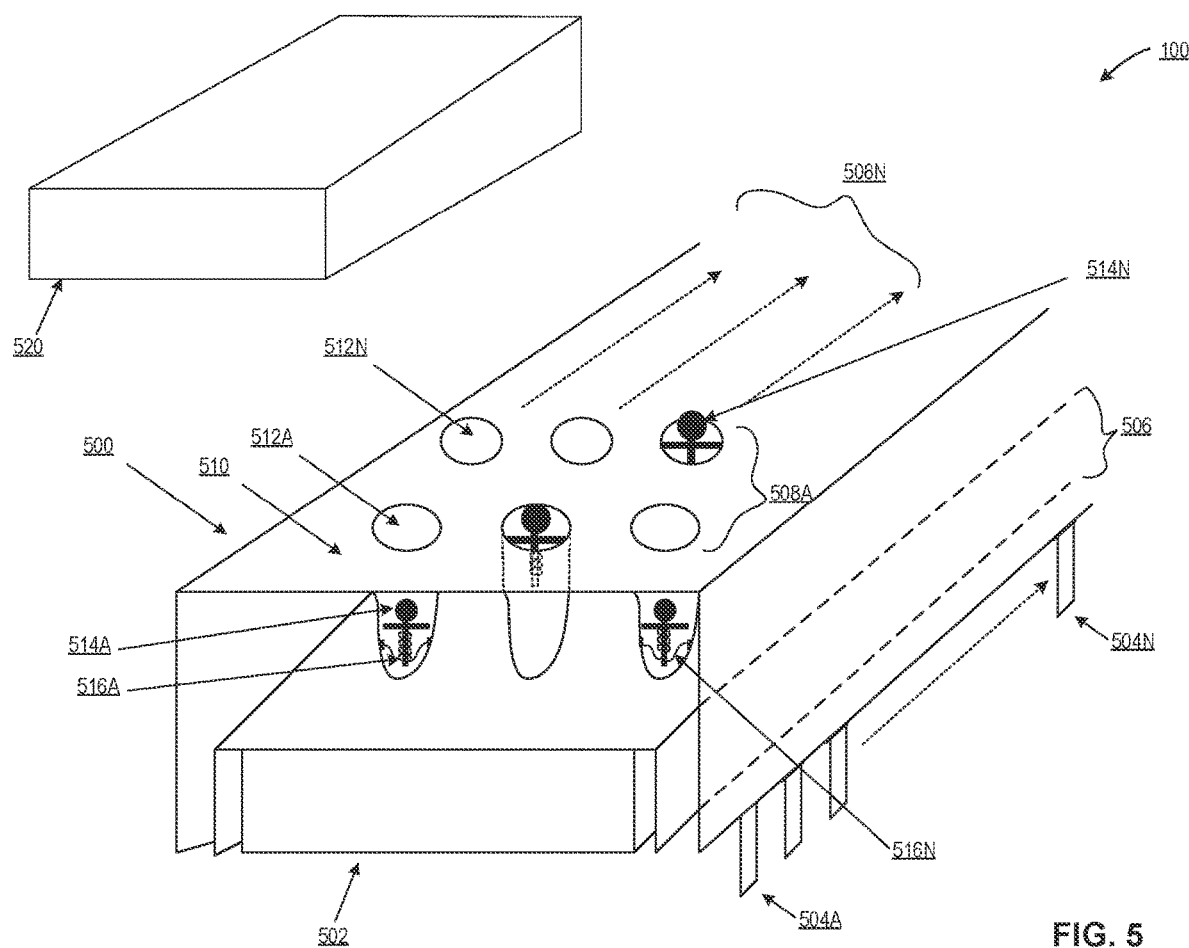
FIG. 5 depicts an exemplary schematic of the refreshable braille display system described herein.
Figure 6:
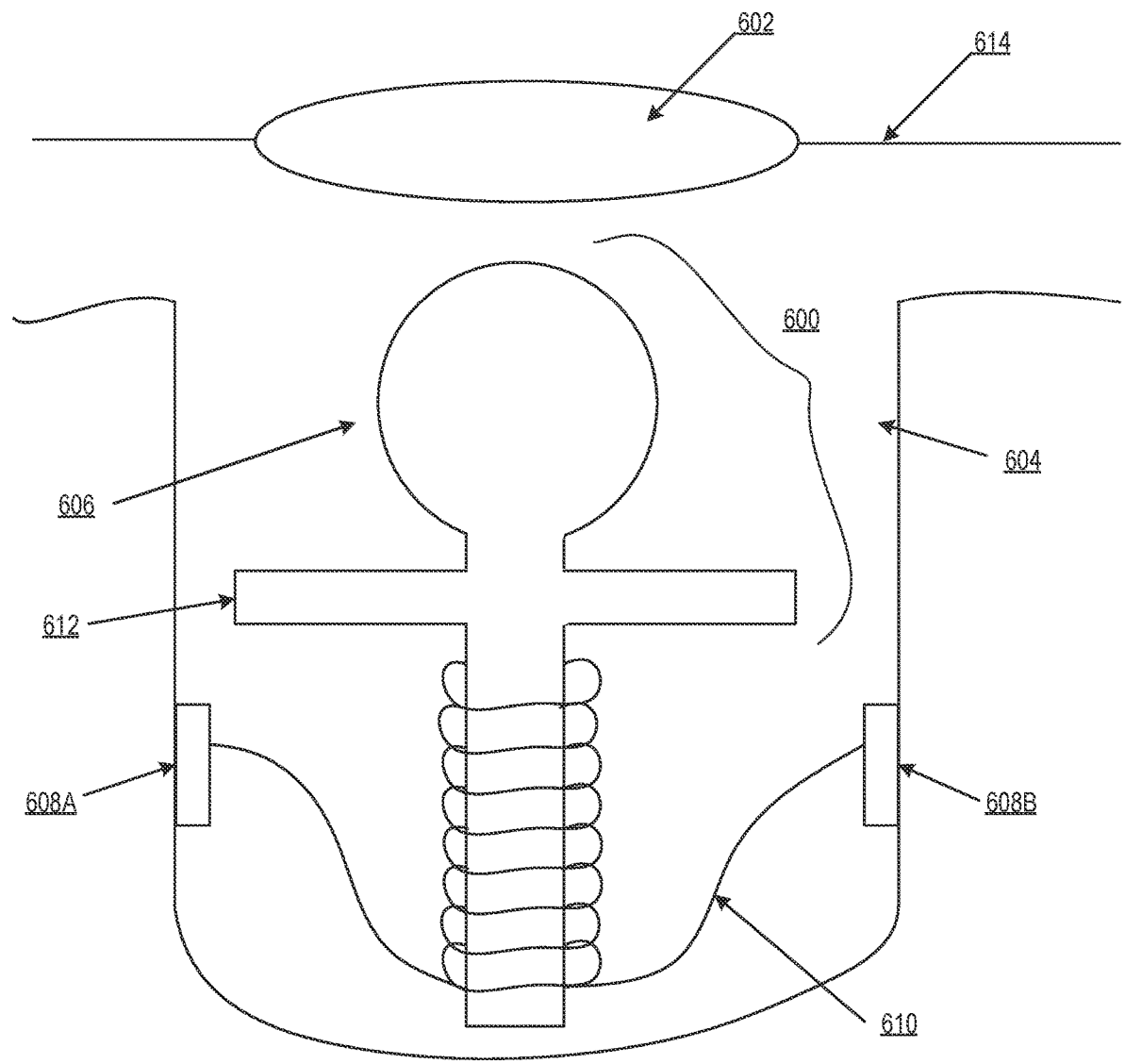
FIG. 6 depicts an exemplary schematic of a braille pin of the refreshable braille display system described herein.

Each of the braille pins 124A-N, 128A-N, and 132A-N can be at least partially wrapped in the solenoids 126A-N, 130A-N, and 134A-N, respectively (e.g., refer to FIGS. 5-6). The solenoids 126A-N, 130A-N, and 134A-N can be coils and can provide current(s) to one of more braille pins 124A-N, 128A-N, and 132A-N, respectively, in order to extend one or more of the pins such that the user can read the associated braille character data (e.g., refer to FIGS. 5, 11).

Figure 2A:
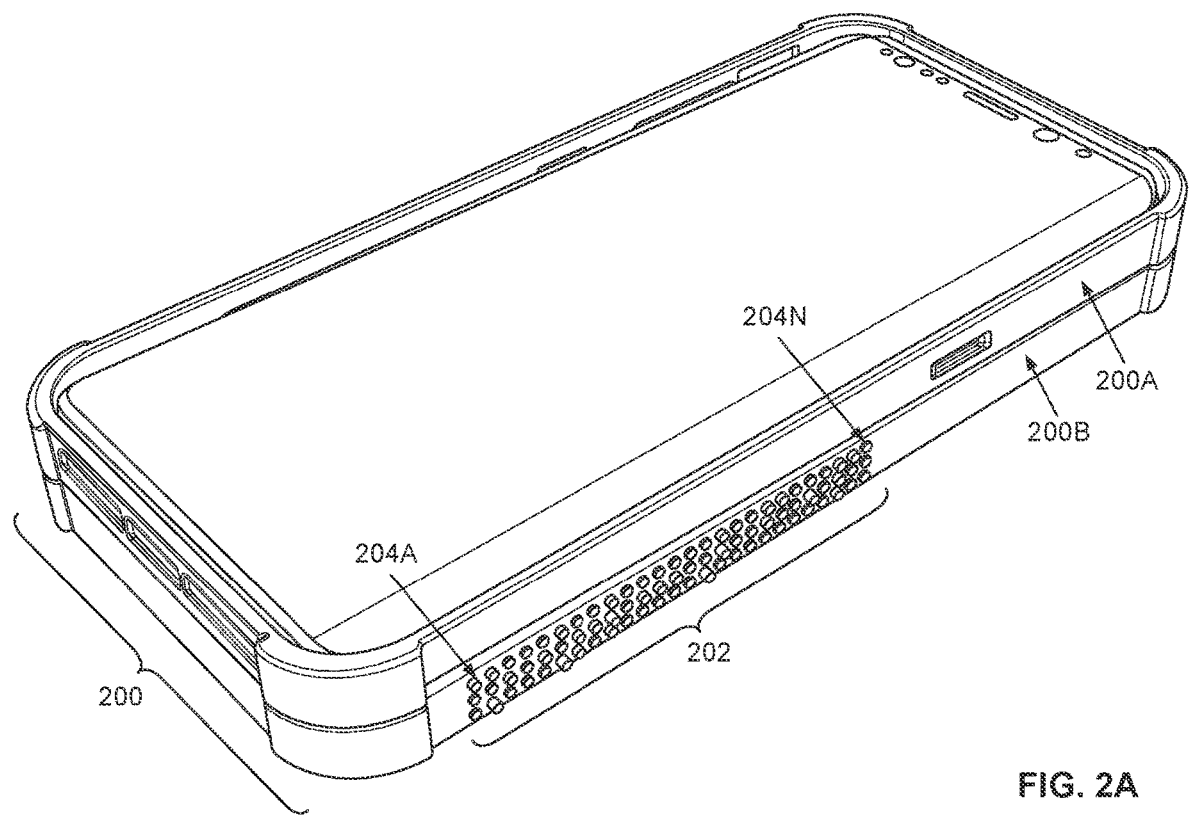
FIGS. 2A-C depict exemplary views of the refreshable braille display system configured to mobile devices.
Figure 2B:
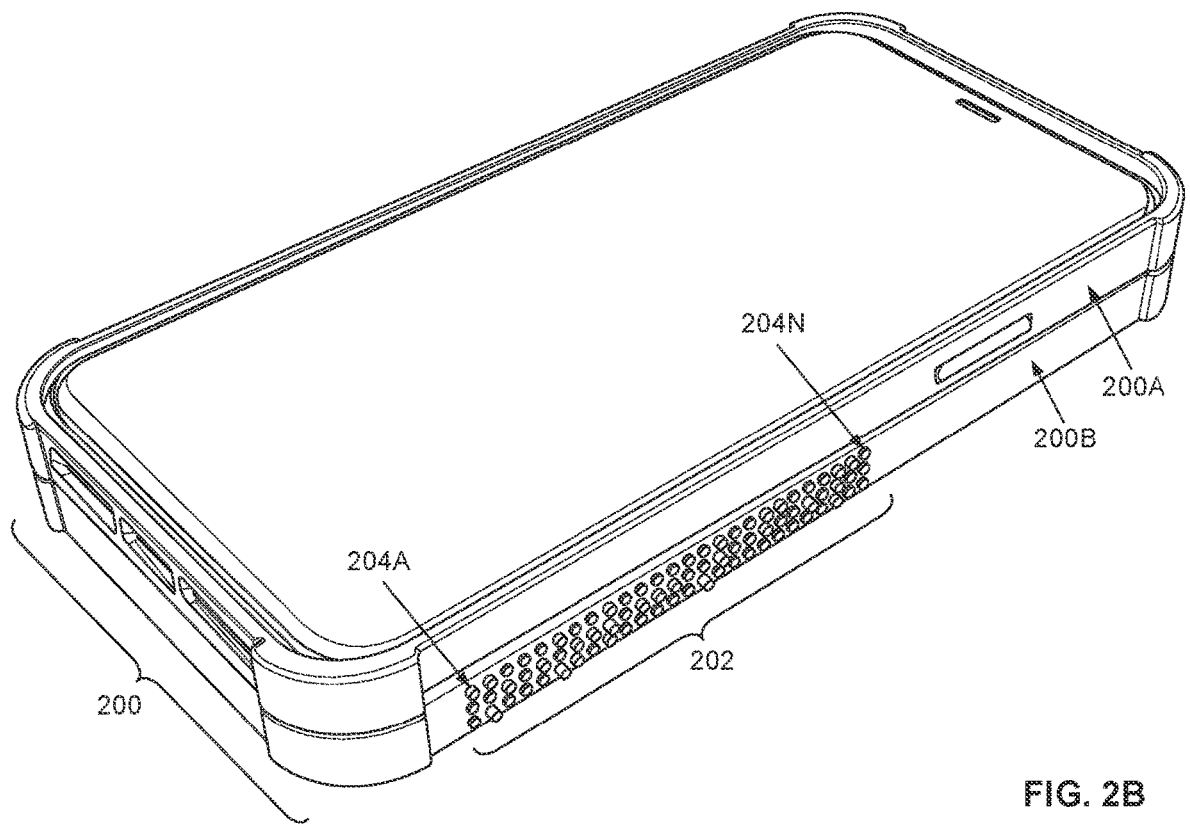
Figure 2C:
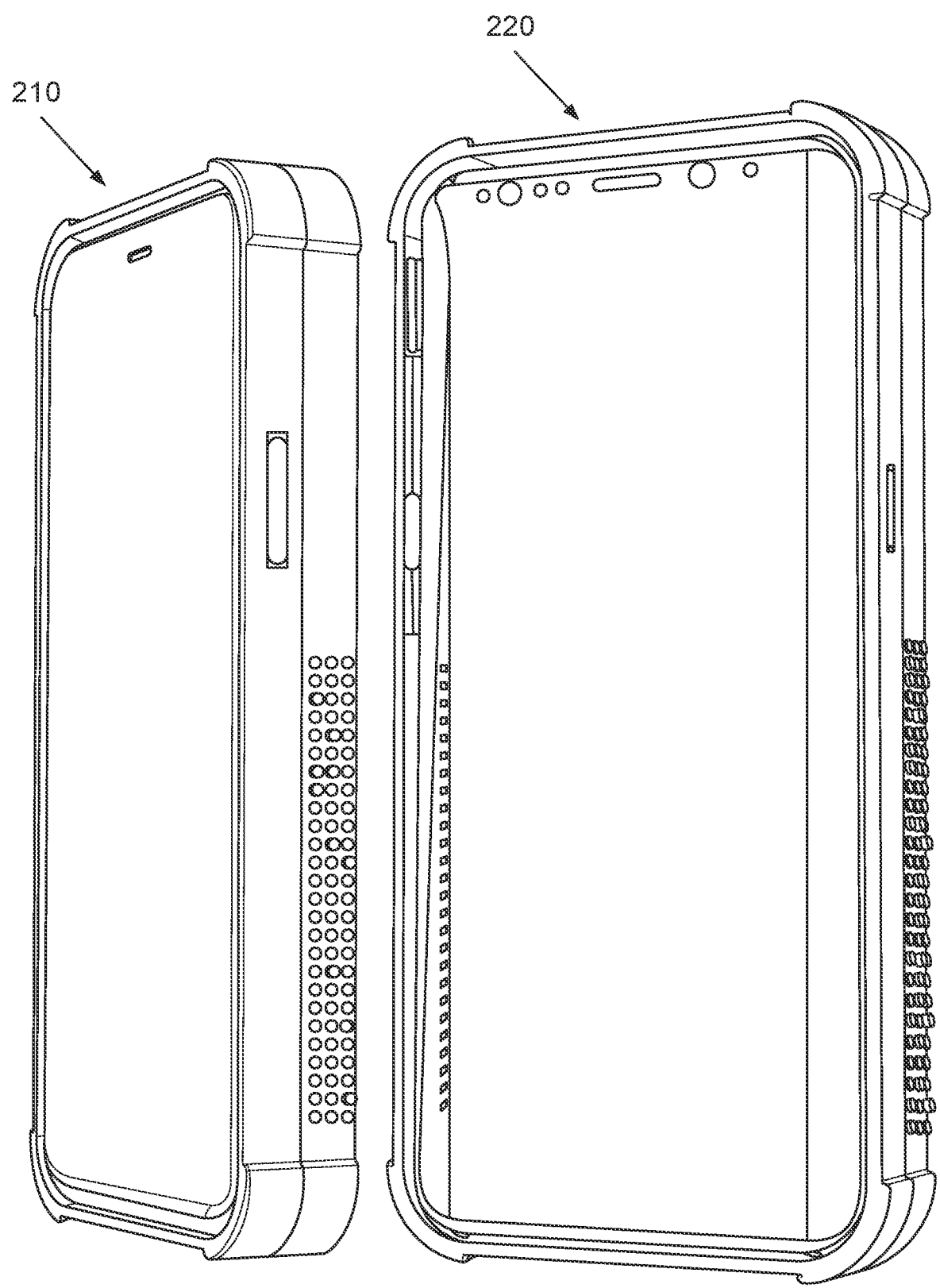

FIGS. 2A-C depict views of example refreshable braille display apparatuses configured to various devices. FIG. 2A depicts an example refreshable braille display apparatus as a case 200 configured to attach to an ANDROID™ mobile device. FIG. 2B depicts another example refreshable braille display apparatus as the case 200 configured to attach to an APPLE mobile device (e.g., iPhone). FIG. 2C depicts yet another example refreshable braille display apparatus as cases configured to attach to both APPLE mobile devices 210 and ANDROID mobile devices 220.

Referring to FIGS. 2A-C, the case 200 includes a detachable upper portion 200A and a bottom portion 200B. The upper portion 200A and the bottom portion 200B can be attached to each other by one or more connectors (e.g., fasteners, pins, snaps). Alternatively, the upper portion 200A and the bottom portion 200B can be made as a single unit. A user can snap the case 200 around the mobile device (e.g., smartphone, cellphone) to secure it in place. The bottom portion 200B of the case 200 can include a reading area 202 having a plurality of braille pins 204A-N (e.g., refer to FIGS. 3-5, 7-10). The braille pins 204A-N can be included in units (e.g., contact units), as described throughout this disclosure. Each unit can be controlled separately by a controller (e.g., the microcontroller 114 in FIG. 1), wherein each unit receives one or more currents at different times to display one or more braille character data. In implementations where each braille character is displayed a number of times equivalent to a number of units, the user can read each braille character without having to move their finger(s) over the reading area 202 (e.g., refer to FIGS. 8-10).

As described herein, the braille pins 204A-N can be extended from the bottom portion 200B, such that they are readable by the user. The user can statically position one or more fingers over the reading area 202. As one of more of the pins 204A-N are actuated to extend from the bottom portion 200B of the case 200, the user does not have to move their fingers along the reading area 202. This is because one or more currents can be sent to the units (e.g., contact units) of pins 204A-N such that each braille character is delivered one at a time and repeated across the units of pins 204A-N (e.g., refer to FIGS. 9, 11). Regardless of where the user positions their finger(s), the user can read each braille character that is displayed and/or confirm braille character data that is read by the user. This configuration is advantageous to help the user learn braille and improve their braille literacy. In other implementations, the user can statically position their fingers over each unit of braille pins 204A-N and each unit can receive a current to actuate the braille pins 204A-N in that unit to correspond to different braille character data (e.g., refer to FIG. 10). The user does not have to move their fingers along the reading area 202 in order to read multiple braille characters at the same time. This is advantageous for users that are familiar and/or comfortable with reading braille (e.g., legally blind users).

Still referring to FIGS. 2A-C, in some implementations, the case 200 can include more than one reading area 202. For example, reading areas can be located on any sides of the bottom portion 200B and/or the upper portion 200A of the case 200. In other implementations, the reading area 202 can be on a back side of the case 200. Positioning the reading area 202 on the back of the case 200 can be advantageous where the case 200 is configured to attach to larger devices, such as tablets and laptops.

The configurations depicted in FIGS. 2A-C are advantageous for use by any type of user, regardless of whether they are legally blind, wanting to learn how to read braille, right-handed, or left-handed. In some implementations, the units of pins 204A-N can be manufactured/installed on a right side or a left side of the bottom portion 200B of the case 200. In other implementations where the pins 204A-N can only be installed on one side of the bottom portion 200B of the case 200 (e.g., on the right side), a user can still read braille characters because the user is not required to move their fingers over the reading area 202. If the user holds the mobile device in a left hand and the pins 204A-N are installed on the right side of the bottom portion 200B of the case 200, then at least one finger (e.g., index, middle, ring, and/or pinkie finger) is statically positioned over a portion of the reading area 202 (e.g., one or more units of the pins 204A-N) to read each braille character as it is displayed. Likewise, if the user holds the mobile device in a right hand and the pins 204A-N are installed on a right side of the bottom portion 200B of the case 200, then the user's thumb can be statically positioned over any portion (e.g., at least one unit of pins 204A-N) of the reading area 202 such that the user can read each braille character as it is displayed in each unit of the pins 204A-N.

In some implementations, the case 200 can be manufactured to attach to a larger computing device, such as a tablet and/or a computer (e.g., laptop). In the case of the tablet, the reading area 202 can be located on a back side of the case 200. As the user holds the tablet with one or two hands, the user's fingers can be positioned over the reading area 202 in order to reach each braille character as it is displayed. The case 200 of the tablet can include multiple reading areas 202, for example, for each hand that holds the tablet. The braille character data can be displayed at a same time in both reading areas and/or at different times. Some braille character data can be displayed at one reading area while other braille character data is displayed at a second reading area. The user can modify how braille character data is displayed at the reading area(s) 202 by interacting with the mobile application 104, as described in FIG. 1. In the case of a laptop, the reading area 202 can be located on any portion of the laptop, such as a region below a keyboard, alongside a touchpad, and/or along a perimeter of a display screen. In these various applications of the case 200 to different computing devices, the refreshable braille display apparatus described herein functions in the same or similar manners, and provides the same or similar benefits described herein.

Figure 3:
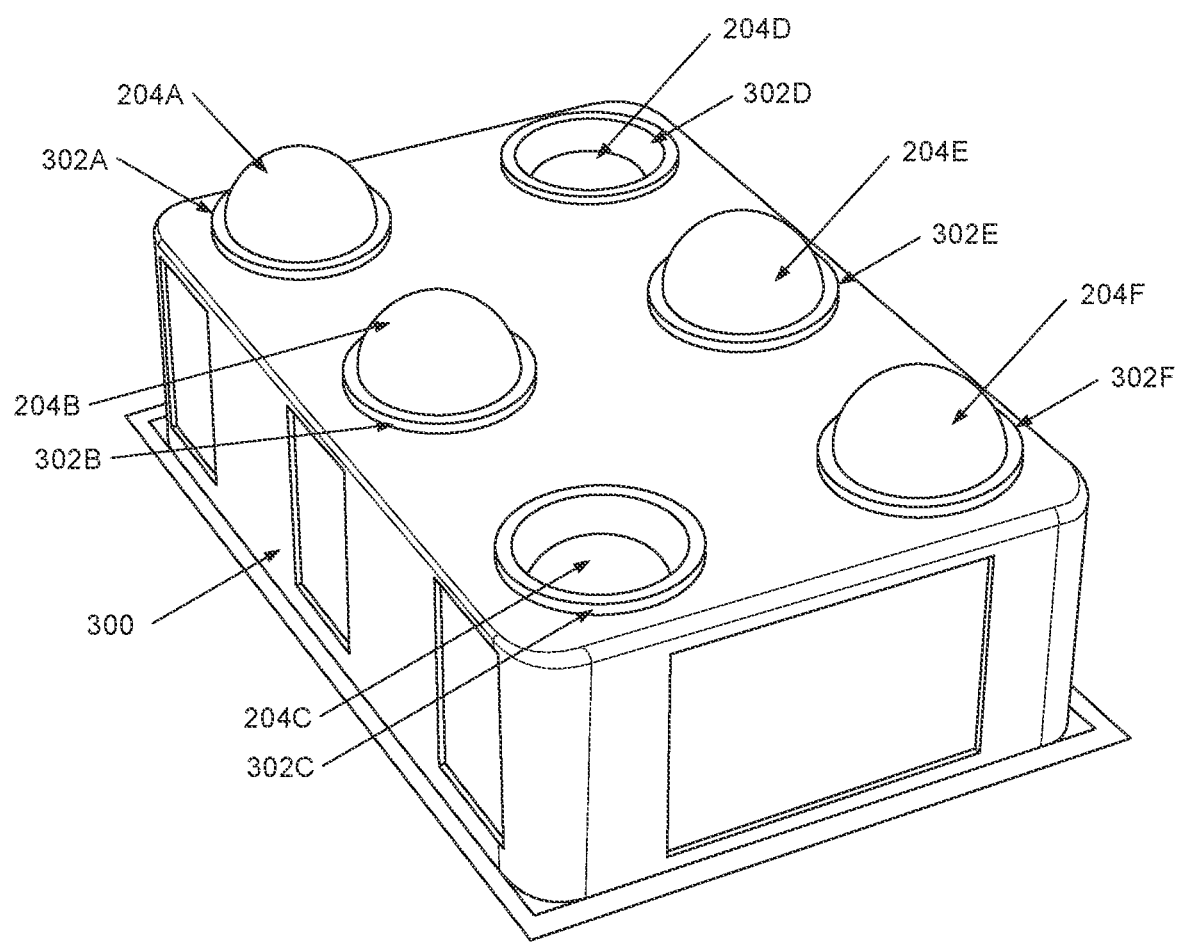
FIG. 3 depicts an exemplary unit of braille pins of the refreshable braille display system described herein.

FIG. 3 depicts an exemplary unit 300 (e.g., contact unit) of braille pins. The unit 300 includes one or more braille pins 204 (e.g., 204A-F). As depicted, the unit 300 includes six pins 204A-F. Six pins can be a beneficial minimum number of pins required to display any braille character. In addition, using the minimum number of pins can reduce potential servicing of individual pins, units, or other components of the refreshable braille display apparatus. Reducing frequency of servicing can reduce associated servicing costs. Moreover, having the minimum number of pins in a unit can make it easier and faster to identify any particular pin that requires servicing.

Alternatively, the unit 300 can include more or less than six pins. In some implementations, eight pins can be a preferred number of pins per unit. Eight pins can be beneficial in configurations where a reading area (e.g., refer to the reading area 202 in FIGS. 2A-C) is larger (e.g., when the refreshable braille display apparatus is configured to attach to a larger computing device, such as a laptop or tablet). As depicted in FIGS. 2A-C, the reading area 202 comprises of thirteen units of six pins each. Each unit 300 of the thirteen units can be controlled separately (e.g., refer to FIGS. 9-11) such that braille character data is displayed at different times at each unit 300. In other implementations, the reading area 202 can include more or less than 13 units.

The unit 300 includes one or more cavities 302 (e.g., 302A-F) (e.g., containers, cylinders) (e.g., refer to FIGS. 4-6). As depicted in FIG. 3, there are six cavities 302A-F, each of which house the six braille pins 204A-F. In a configuration in which the unit 300 has eight pins 204, the unit 300 can include eight cavities 302. As depicted in FIG. 3, each of the cavities 302A-F has an opening in which a braille pin can be selectively extended through, such that the pin can display a braille character that the user reads. In some implementations, one or more of the pins 204A-F can be removable from the cavities 302A-F. This can be beneficial to provide for easy and efficient servicing of the pins 204A-F and/or solenoids wrapped at least partially around the pins 204A-F. For example, a user can replace a single pin rather than replace an entire unit of braille pins where the single pin requires maintenance. This is both less expensive and faster servicing. In some implementations, the unit 300 can include a bar magnet housed opposite the cavities 302A-F, which can improve versatility.

The unit 300 can be attached to a contact surface of a first base, such as the bottom portion 200B of the case 200 depicted and described in FIGS. 2A-C. The contact surface can be configured to permit multiple fingertips to simultaneously contact the unit 300 or a plurality of units. In some implementations, the contact surface can receive one or two units. In other implementations, the contact surface can receive more than two units. In some implementations, the unit 300 can be removable from the contact surface and replaced with another unit. This is advantageous for servicing and maintenance of one or more components of the unit 300. Regardless of how many units are attached to the contact surface, each set of pins 204A-F within each unit can be positioned identically. Additionally, the units can be positioned alongside each other (e.g., side-by-side) on the contact surface.

Figure 4A:
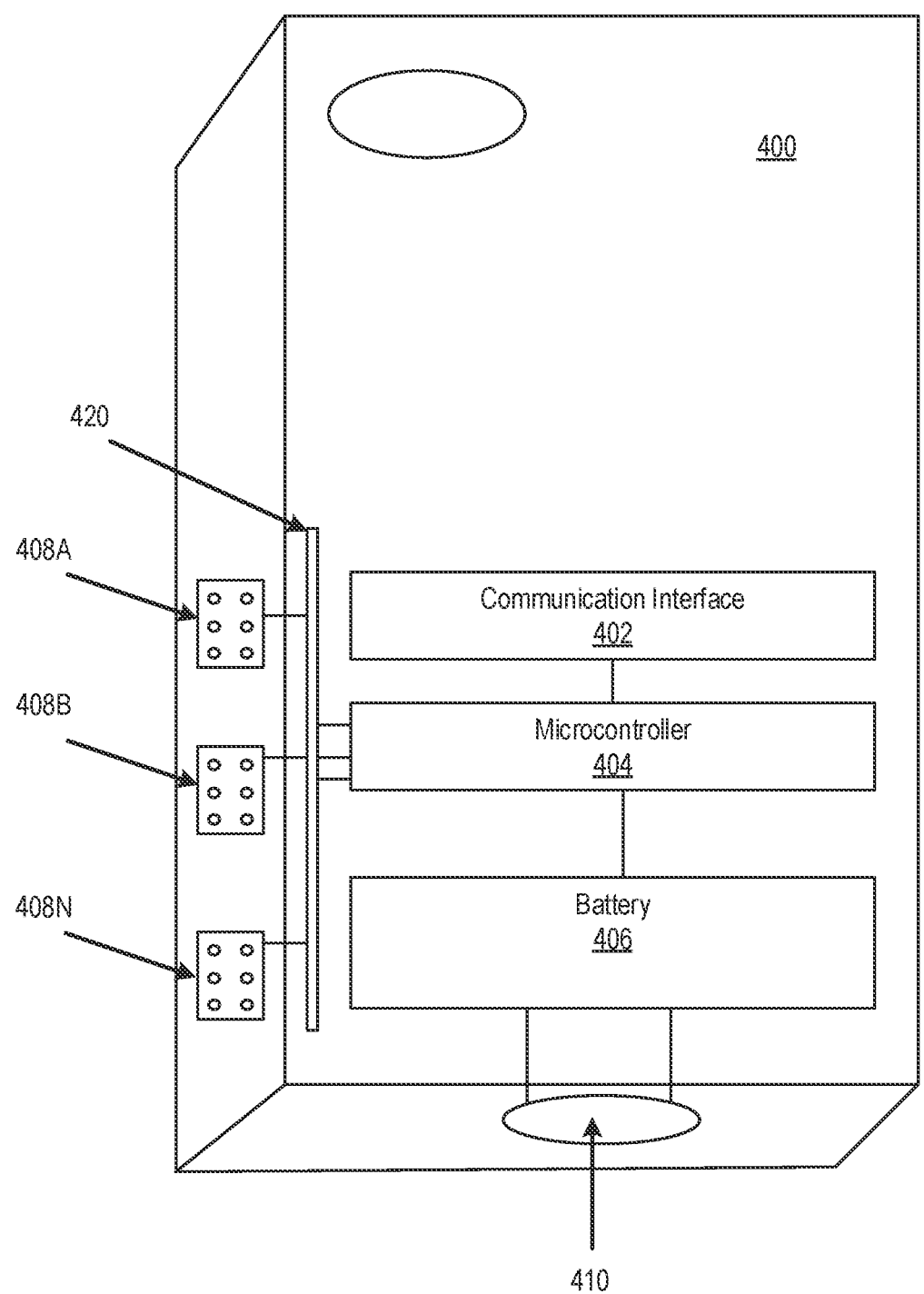
FIGS. 4A-F depict an exemplary refreshable braille display system configuration.

FIGS. 4A-F depict an exemplary refreshable braille display apparatus configuration. In FIG. 4A, a case 400 can be attached to a mobile device, such as a smartphone (e.g., refer to the user device 102 in FIG. 1, FIGS. 2A-C). Depicted is a backside of the case 400. Embedded within the backside of the case 400 is a communication interface 402, a microcontroller 404, a battery 406, and a power strip 420. The communication interface 402 can be configured and operate similarly to the communication interface 108 in FIG. 1. The microcontroller 404 can be configured and operate similarly to the microcontroller 114 in FIG. 1. The battery 406 can be configured and operate similarly to the power source 112 depicted in FIG. 1. The battery 406 can supply power to the microcontroller 404. In some implementations, the battery 406 can also supply power to the communication interface 402. As depicted in FIG. 4A, the communication interface 402 can be powered by energy transmitted from the battery 406 to the microcontroller 404. The power strip 420 can be configured to disperse electric currents to one or more braille pins/units of pins in accordance with output from the microcontroller 404.

In some implementations, the battery 406 can be 3.7 v 5000 mah. The battery 406 can be charged by a charging controller 410. The charging controller 410 can receive a Micro USB, USB-C, and/or Lightning cable, depending on a type of mobile device that the case 400 is attached to. In some implementations, the battery 406 can be charged by connecting it, via a charging cable previously described, to the mobile device. In other implementations, the battery 406 can be charged by connecting it to an outlet or other charging port. The battery 406 can be easily and more efficiently replaced with a new battery. In yet other implementations, the battery 406 can be wirelessly charged.

Still referring to FIG. 4A, one or more units 408A-N of braille pins are positioned along a side of the case 400 and in wired communication with one or more components of the refreshable braille display apparatus 100. The units 408A-N can be configured and operate similarly to the units 122A-N depicted in FIG. 1. As depicted in FIG. 4A, the units 408A-N are in wired communication with the microcontroller 404. In other implementations, the units 408A-N can also be in wired communication with the battery 406.

Figure 4B:
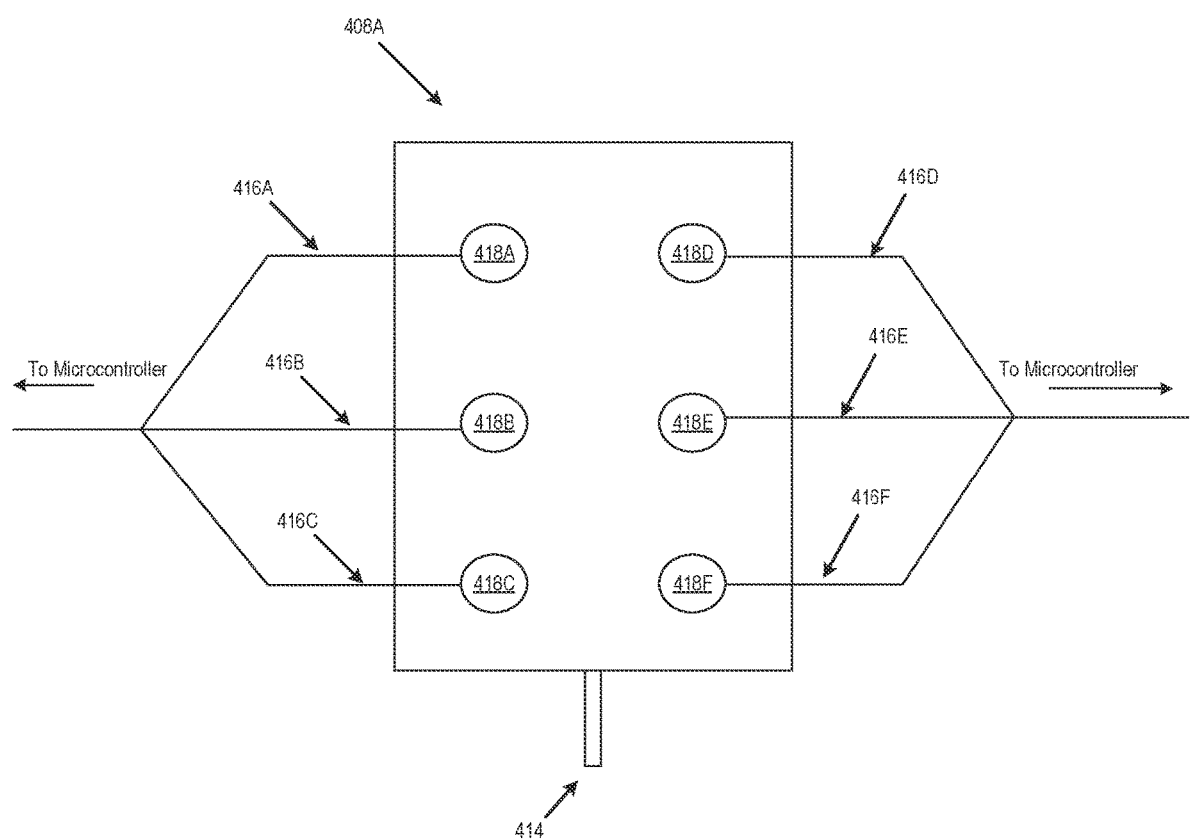

FIG. 4B depicts the unit 408A. The unit 408A includes six cavities 418A-F configured to house braille pins (e.g., refer to FIGS. 3, 5-6). Each of the cavities 418A-F are in wired communication with the microcontroller by wires 416A-F (e.g., refer to the solenoids depicted in FIGS. 1, 5-6). The microcontroller can send input signals to one or more of the braille pins housed in each of the cavities 418A-F using the wires 416A-F. In some implementations, the signals coming from the microcontroller can be a bus with a width of three signals, wherein a series of wires transmits each signal separately to the unit 408A and/or the cavities 418A-F. As described further herein, the input signals generate currents that cause one or more of the braille pins to selectively extend through the cavities 418A-F so that a user can read the braille characters (e.g., refer to FIG. 11). The unit 408A can also be in wired communication with the battery via an electrical connector 414.

Still referring to FIG. 4B, in some implementations, the unit 408A actuates by receiving a signal (e.g., +5V) from the battery via the electrical connector 414. The unit 408A can be configured to be connected to a positive voltage supply from the battery. The microcontroller can be configured to ground the unit 408A's received signal for each of the cavities 418A-F, which causes one or more braille pins within the cavities 418A-F to remain lowered. The microcontroller can also be configured to send a signal (e.g., +5V), via the power strip 420 described in reference to FIG. 4A, to the unit 408A to control the cavities 418A-F. The signal from the microcontroller can cause one or more braille pins within the cavities 418A-F to extend through an opening in the cavities 418A-F (e.g., refer to FIG. 5, 11). As a result, the microcontroller merely sends one signal to the unit 408A in order to selectively extend one or more braille pins from the cavities 418A-F. This configuration is advantageous in order to reduce an amount of power required to operate the refreshable braille display apparatus. This can also be advantageous because one or more components of the apparatus described herein (e.g., the wires 416A-F, the battery 406, etc.) can require less servicing, maintenance, and/or replacement.

Figure 4C:
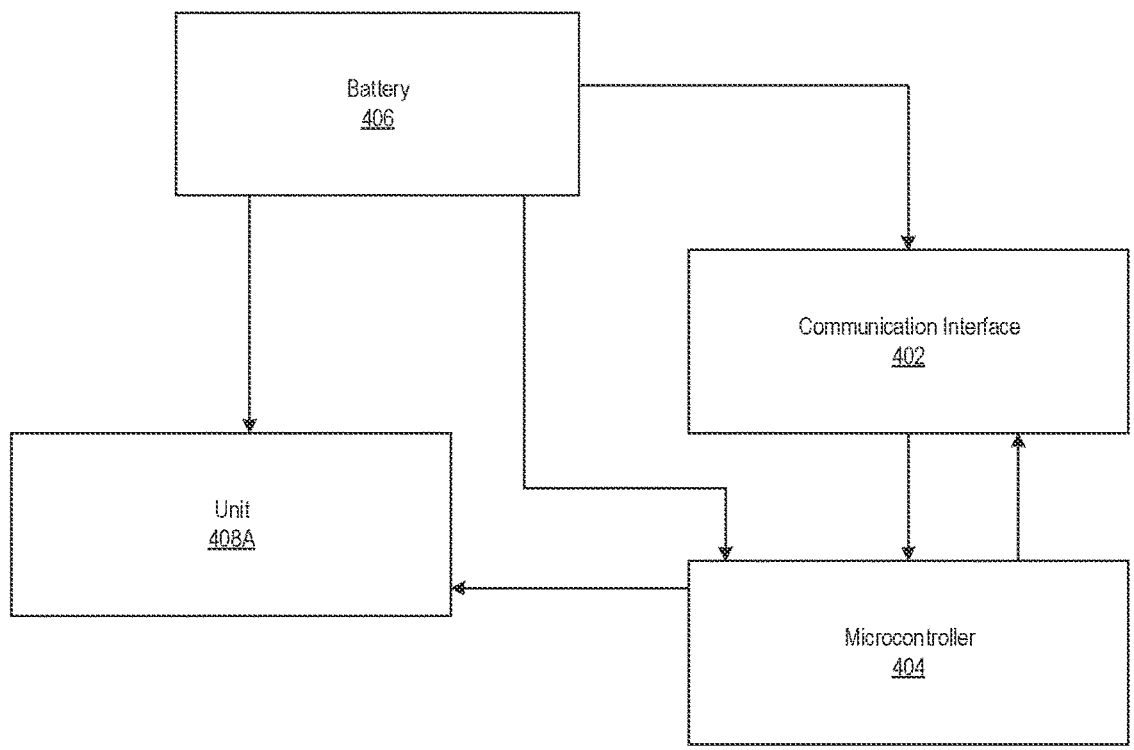

FIG. 4C depicts one or more of the components described in FIGS. 4A-B in wired communication with each other. For example, electrical power (in the form of voltage and/or current) can be provided from the battery 406 to the unit 408A or any of the other unit in the apparatus. In other implementations, the unit 408A and any of the other units in the apparatus can be in wired communication with only the microcontroller 404 and can receive electric currents from the power strip 420 previously described in reference to FIG. 4A. Voltage can also be provided from the battery 406 to the microcontroller 404 in order to power the microcontroller 404. Voltage can also be provided from the battery 406 to the communication interface 402 such that the communication interface 402 can operate and receive wireless signals (e.g., via BLUETOOTH technology) with a mobile device. In other implementations, the communication interface 402 can be in wired communication with only the microcontroller 404 and can be powered by voltage that is provided from the battery 406 to the microcontroller 404.

Still referring to FIG. 4C, the communication interface 402 can have two-way wired communication with the microcontroller 404. For example, the microcontroller 404 can send a request to the communication interface 402 to determine whether text data has been received from the mobile device (e.g., refer to FIG. 11). The communication interface 402 can also transmit text data received from the mobile device to the microcontroller 404. The text data can be transmitted from the communication interface 402 upon request from the microcontroller 404 or automatically (e.g., once the test data has been received at the communication interface 402 without requiring a request from the microcontroller 404). Additionally, as depicted, the microcontroller 404 can be in wired communication with the unit 408A, as well as each of the units in the apparatus described herein. As described regarding FIGS. 4A-B, the microcontroller 404 can communicate with the unit 408A and each of the units in the apparatus in order to control actuation of one or more braille pins within each of the units.

Figure 4D:
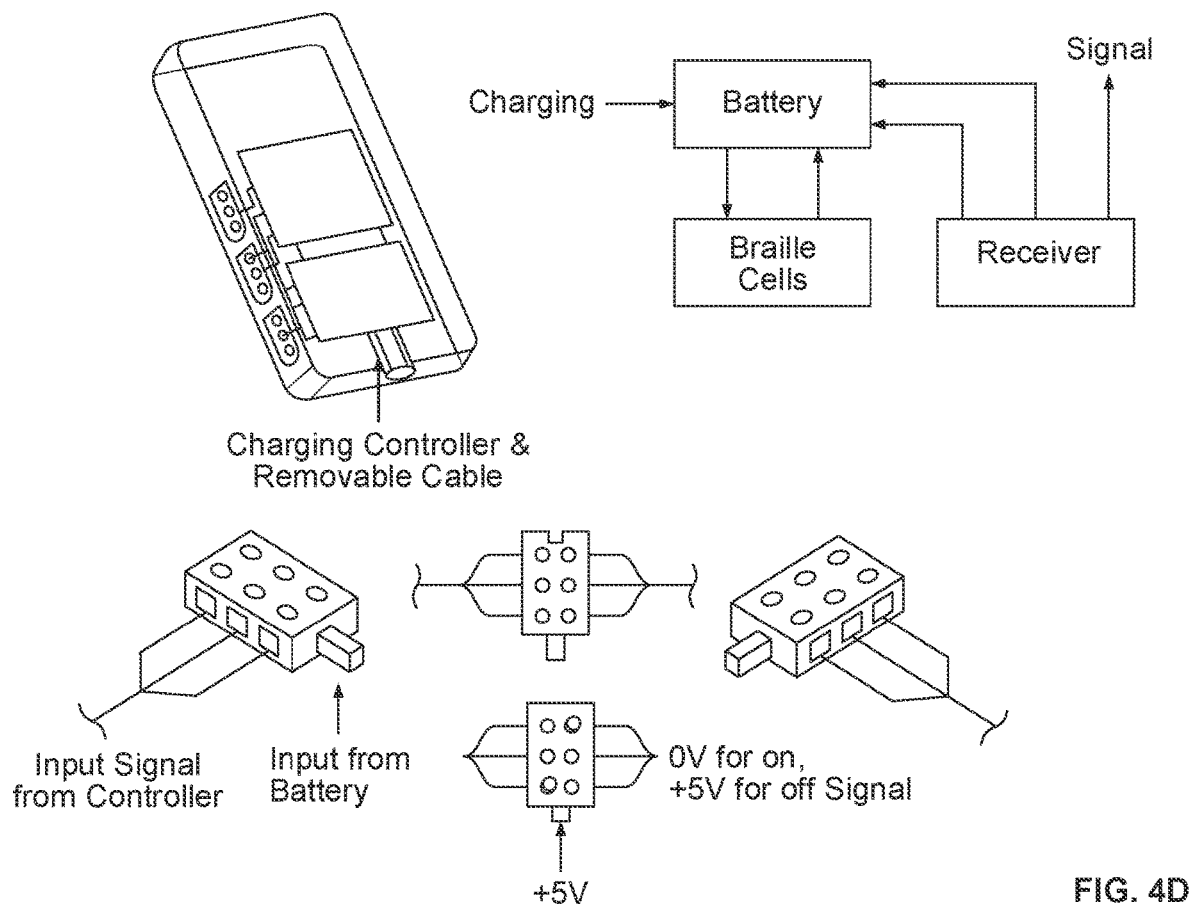
Figure 4E:
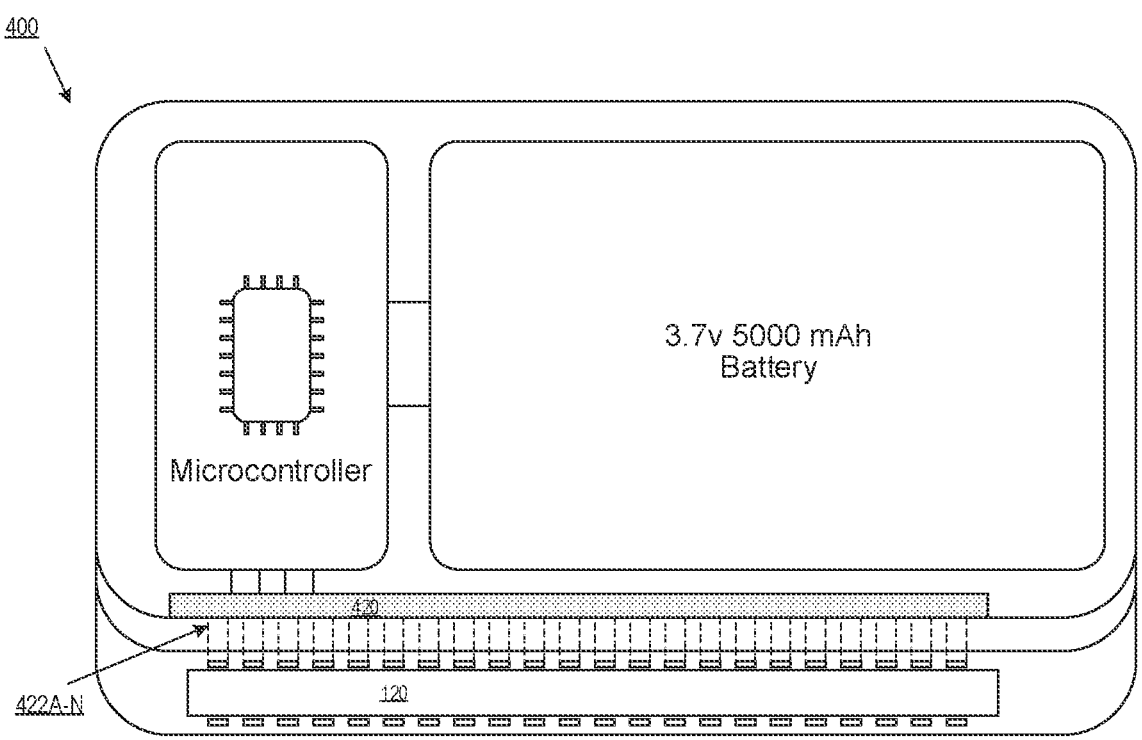
Figure 4F:
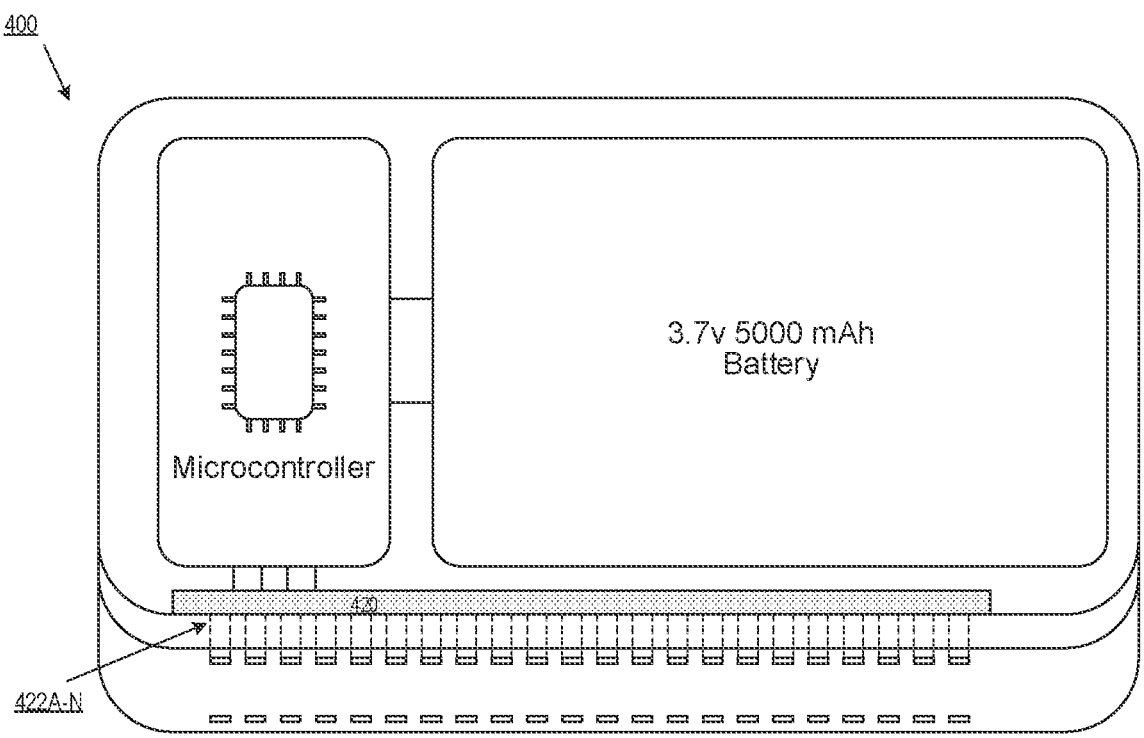

FIG. 4D depicts one or more of the components described in FIGS. 4A-C. FIG. 4E depicts one or more components of the refreshable braille display apparatus described in FIGS. 4A-D. In FIG. 4E, a magnet 120 (e.g., the bar magnet 120 in FIG. 1) is depicted within the case 400 (e.g., refer to the case 400 in FIG. 4A). The magnet 120 can be positioned behind one or more units of braille pins (e.g., refer to the one or more units 408A-N in FIG. 4A). As depicted in FIG. 4E, in some implementations, one or more wires 422A-N can pass current from a power strip 420 to each of the one or more braille pins. In other implementations, one or more wires 422A-N can pass current from the power strip 420 to each of the one or more units of braille pins. FIG. 4F depicts one or more components of the refreshable braille display apparatus described in FIGS. 4A-E without the magnet 120 depicted and described above.

FIG. 5 depicts an exemplary schematic of the refreshable braille display apparatus 100 described herein. The apparatus 100 includes a first base 500. The first base 500 includes a contact surface 510, which can be configured to receive fingertips of a user (e.g., refer to FIG. 8). The first base 500 also includes a plurality of cavities 512A-N (e.g., openings) (e.g., refer to the cavities 302A-N in FIG. 3). The plurality of cavities 512A-N can be recessed from the contact surface 510, as depicted in FIG. 5. As described herein, one or more of the cavities 512A-N can be removable from the base 500. A plurality of pins 514A-N (e.g., refer to the pins 204A-N in FIGS. 2A-C) can be housed within the plurality of cavities 512A-N and configured to move in the plurality of cavities 512A-N to selectively extend from the contact surface 510 of the first base 500.

A plurality of solenoids 516A-N (e.g., refer to FIG. 6) can be configured to at least partially receive and/or operably connect to the plurality of pins 514A-N. As depicted, the plurality of solenoids 516A-N are coils that wrap around the plurality of pins 514A-N. In some implementations, the plurality of solenoids 516A-N can be made of a material including iron. In some implementations, a magnet 502 can be configured to generate an attractive force relative to the plurality of pins 514A-N such that the plurality of pins 514A-N are biased into the cavities 512A-N. The apparatus 100 further includes a controller, which can be configured to selectively provide an electric current to the plurality of solenoids 516A-N to generate a magnetic field or repulsive force through the plurality of solenoids 516A-N. The magnetic field/repulsive force can be configured to selectively move the plurality of pins 514A-N to extend from the contact surface 510 of the first base 500 and away from the magnet 502. In yet other implementations, the controller can be configured to selectively provide a first electric current to the plurality of solenoids 516A-N to generate first magnetic fields through the plurality of solenoids 516A-N. The first magnetic fields can be configured to selectively move the plurality of pins 514A-N to extend from the contact surface 510 of the first base 500. In some implementations, the controller can also be configured to selectively provide a second electric current to the plurality of solenoids 516A-N to generate second magnet fields through the plurality of solenoids 516A-N. The second magnetic fields can be configured to selectively move the plurality of pins 514A-N into the cavities 512A-N.

The plurality of cavities 512A-N as well as the pins 514A-N can be arranged into one or more contact units 508A-N (e.g., refer to FIGS. 3, 8-10). In some implementations, the contact surface 510 can include the plurality of contact units 508A-N, wherein each contact unit has one or more of the plurality of cavities 512A-N. Each of the contact units 508A-N can be configured to permit for a fingertip to contact such that the user can read braille as the pins 514A-N are selectively extended from the contact surface 510 in each of the contact units 508A-N. The contact surface 510 can be configured to permit multiple fingertips to simultaneously contact the plurality of contact units 508A-N, respectively (e.g., refer to FIGS. 9-10). The contact surface 510 can be configured to receive at least one or more contact units 508A-N, such as a first contact unit and a second contact unit. In some implementations, each of the plurality of contact units 508A-N of the first base 500 can include at least six cavities 512A-N (e.g., refer to FIG. 3). A first subset of the plurality of pins 514A-N (e.g., six pins) in the first contact unit can be positioned identically to a second subset of the plurality of pins 514A-N (e.g., six pins) in the second contact unit. As depicted in FIG. 5, the contact units 508A-N can be arranged side by side, along a length of the first base 500.

Still referring to FIG. 5, the apparatus 100 includes the magnet 502 disposed in a housing 502. The magnet 502 can be a bar magnet. The magnet 502 can extend an entire length of the first base 500. In some implementations, the magnet 502 can extend for a shorter length of the first base 500. In yet other implementations one or more magnets 502 can be positioned along a length of the first base 500. The magnet 502 can be configured to generate an attractive force relative to the plurality of pins 514A-N. As a result of the attractive force, the plurality of pins 514A-N can be biased into the cavities 512A-N. The first magnet fields generated by the plurality of solenoids 516A-N can create repulsion forces between the plurality of pins 514A-N and the magnet 502. Such repulsion forces can be configured to cause the plurality of pins 514A-N to extend from the contract surface 510 of the first base 500.

The apparatus 100 can further include a second base 520 that is configured to house the controller previously described (e.g., refer to FIGS. 4A-C). The second base 520 can attach to the first base 500 by one or more connectors 504A-N that extend from the first base 500. The connectors 504A-N can be configured to engage with the second base 520 to attach the first base 500 to the second base 520. The connectors 504A-N can include conductive wires that are configured to electrically connect the controller to the plurality of solenoids 516A-N. In some implementations, the conductive wires of the connectors 504A-N can be made of a material including copper. In some implementations, the second base 520 can optionally house a battery or other power source that provides power to one or more components of the apparatus 100 described herein (e.g., refer to FIGS. 4A-C).

FIG. 6 depicts an exemplary schematic of a braille pin 600 of the refreshable braille display apparatus described herein. As depicted, the braille pin 600 is recessed at least partially within a cavity 604 (e.g., one of the plurality of cavities 512A-N depicted in FIG. 5). The cavity 604 includes an opening 602 on a contact surface 614 (e.g., refer to the contact surface 510 in FIG. 5). The pin 600 can extend through the opening 602 such that a braille dot 606 of the pin 600 is above the contact surface 614. The user can place their fingertip(s) over the contact surface 614 and read the raised braille dot 606. A horizontal bar 612 (e.g., flange, stopper) can be positioned beneath the braille dot 606 such that the pin 600 does not fully extend through the opening 602. This configuration can be beneficial to ensure the pin 600 remains within the cavity 604 and/or does not fall out while the refreshable braille display apparatus is used by the user. In some implementations, the pin 600 may not include the horizontal bar 612.

Still referring to FIG. 6, the cavity 604 can include solenoid connectors 608A-B. The solenoid connectors 608A-B can be configured to receive electric currents from the controller described herein (e.g., refer to FIGS. 5, 11). The solenoid connectors 608A-N are connected to a solenoid 610 (e.g., refer to the solenoids 516A-N in FIG. 5). Upon receiving electric currents at the solenoid connectors 608A-B, the currents can be passed to the solenoid 610 and the solenoid 610 can generate corresponding magnet fields. These magnetic fields, as described throughout this disclosure (e.g., refer to FIGS. 5, 11), can create attractive and/or negative (e.g., repulsion) forces between the pin 600 and a magnet (e.g., refer to the magnet 502 in FIG. 5) such that the pin 600 biases into the cavity 604 and/or extends through the opening 602, respectively.

As depicted, the solenoid 610 is a coil that wraps at least partially around the pin 600. The coil can be made of a material including iron. The solenoid 610 can also be wrapped in an insulator in order to prevent the solenoid 610 from breaking. The configuration of the solenoid 610 as depicted in FIG. 6 is advantageous to reduce effort, cost, and time in servicing the solenoid 610 or any other components housed within the cavity 604. For example, if the solenoid 610 malfunctions, a user can remove the solenoid 610 without having to remove other components of the apparatus, such as the magnet. In some implementations, as described throughout this disclosure, the user can replace the entire cavity 604 with a new cavity having a new solenoid, solenoid connectors, and/or braille pin. In other implementations, as described, the user can replace a unit of pins with a new unit of pins in order to increase efficiency and ease of servicing one or more components therein.

As depicted in FIG. 6, the pin 600 is biased towards a bottom of the cavity 604, which is closer to the magnet (e.g., refer to FIG. 5). The pin 600 is biased towards the bottom of the cavity 604 by an attractive force to the magnet. This configuration is advantageous because the pin 600 can remain biased towards the bottom of the cavity 604 so long as an electric current is not generated or received by the solenoid connectors 608A-B. As a result, less power/current can be used to power the refreshable braille display apparatus described herein, which can reduce servicing, maintenance, and related costs. Because current is managed or being provided in small amounts to some rather than all cavities, less voltage is required to operate the refreshable braille display apparatus described throughout this disclosure. In other implementations, the pin 600 can be attracted to the magnet by a current (e.g., a second current) that is received by the solenoid connectors 608A-B and which is used by the solenoid 610 to generate a magnetic field. The generated magnetic field can create an attractive force between the pin 600 and the magnet, thereby biasing the pin 600 towards the bottom of the cavity 604.

Figure 7:
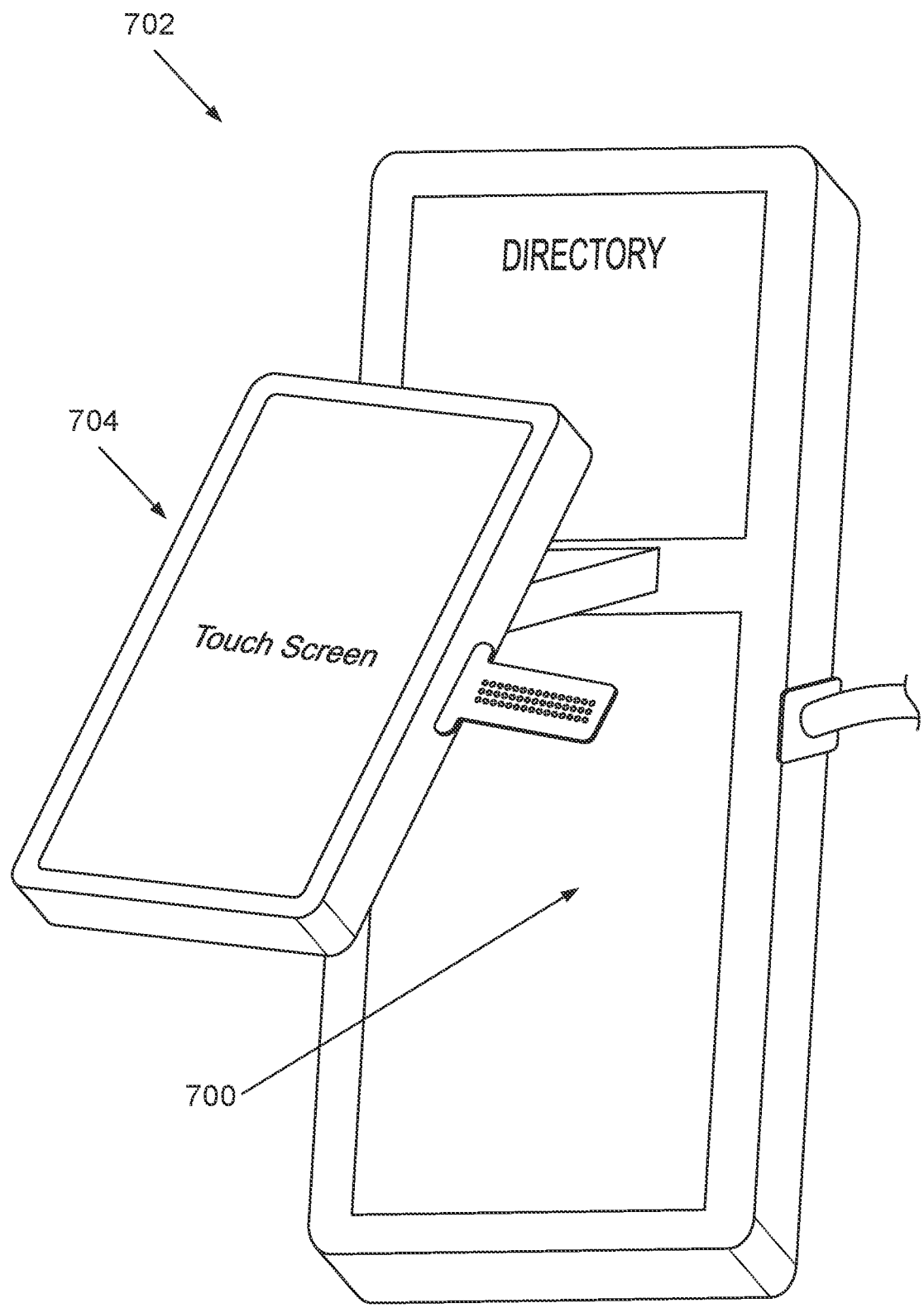
FIG. 7 depicts an exemplary refreshable braille display system.

FIG. 7 depicts an exemplary refreshable braille display apparatus 700 (e.g., refer to the refreshable braille display apparatus 100 described throughout this disclosure). In this example, the apparatus 700 is configured to attach to a touchscreen 704 of a kiosk 704. The apparatus 700 is attached proximate to the touchscreen 704. In other implementations, the apparatus 700 can be attached to any other part of the kiosk 702 and/or the touchscreen 704 where there is a connectivity point. In some implementations, the apparatus 700 can be carried by a user and the user can connect the apparatus 700 to any compatible device, such as the kiosk 702. In other implementations, devices, such as the kiosk 702 can be manufactured with the apparatus 700. In yet other implementations, the apparatus 700 can be configured to attach to any compatible device, such as the kiosk 702, after the kiosk 702 has been manufactured, having BLUETOOTH communication capability and/or a USB port.

In the example depicted in FIG. 7, the apparatus 700 can be configured to attach to the touchscreen 704 via a USB port in the touchscreen 704. Information (e.g., text data) that is displayed on the touchscreen 704 can then be transmitted to the apparatus 700, via the USB communication and/or BLUETOOTH technology, converted into braille character data, and then used to actuate one or more braille pins comprising the apparatus 700 (e.g., refer to FIG. 10). Information can be transmitted wirelessly, via software or a mobile application that establishes a BLUETOOTH and/or WIFI connection between the kiosk 702 and the apparatus 700.

As mentioned, the apparatus 700 can be configured to attach to any device having a display, such as a computer, laptop, tablet, smartphone, and/or kiosk. The kiosk 702 can be located in a transit station (e.g., airport, train station, subway, bus terminal, etc.). The kiosk 702 can also be used in other public locations, such as grocery stores (e.g., to display product pricing, etc.), gas stations (e.g., to purchase products or gas, etc.), and malls (e.g., to display product pricing, navigate, etc.). Incorporating the apparatus 700 into any one of these types of kiosks 702 can be advantageous to help legally blind people navigate and interact with their surroundings in public places. Additionally, building the kiosk 702 to be compatible with the apparatus 700 can make it easier for a user to carry the apparatus 700 with them and attach the apparatus 700 to any compatible device. Compatibility and connectivity can be further facilitated by installation of a mobile application (e.g., refer to the mobile application 104 in FIG. 1) on the kiosk 702 or other device that facilitates such communication between the kiosk 702 and the apparatus 700. As a result, in some implementations, owners of kiosks or other devices in public spaces can merely install the appropriate mobile application (e.g., software) to facility communication and connectivity of the devices with the refreshable braille display apparatus 700 described herein.

Figure 8:
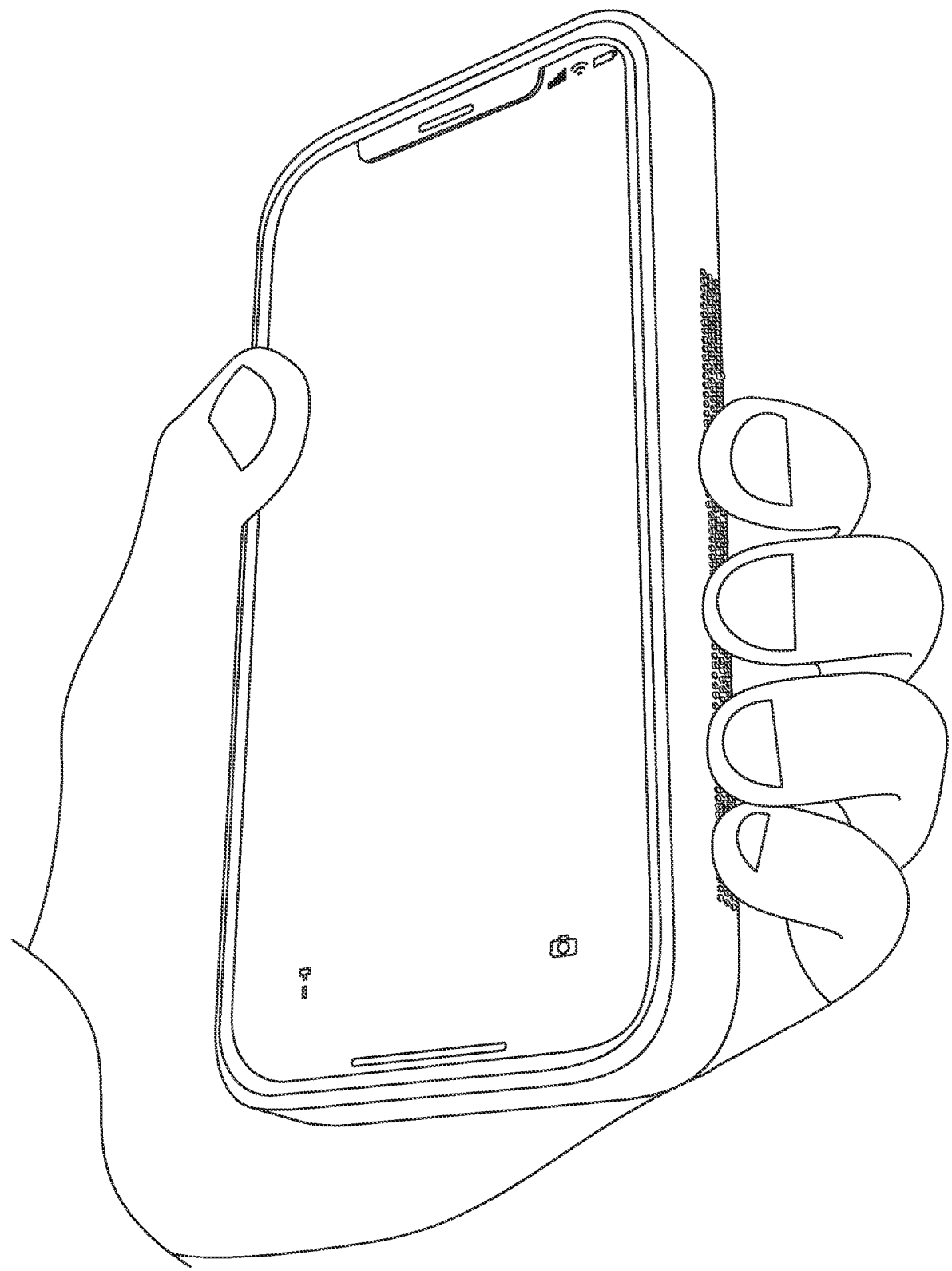
FIG. 8 depicts an exemplary use of the refreshable braille display system.

FIG. 8 depicts an exemplary use of the refreshable braille display apparatus described herein. In this example, the apparatus is a smartphone (e.g., mobile device) case (e.g., refer to the case 200 described and depicted in FIG. 2). A user is holding the case in their left hand. A reading area of the apparatus described herein has a contact surface and a plurality of pins selectively extending from the contact surface on a right side of the case. As depicted, more than one of the user's fingertips are in contact with the contact surface of the reading area. As a result, each of the user's fingertips can feel one or more of the pins selectively extending from the contact surface to form one or more braille character data. The user does not have to move their fingertips along the contact surface of the reading area in order to feel/read the pins as they selectively extend from the contract surface. This configuration can make it easier and/or faster for the user to read the braille character data because the user can maintain their fingertip(s) in a static position. Each of the braille character data can be displayed on the reading area at different time intervals, such that the user can read each braille character data one at a time as they are displayed on the reading area (e.g., for increasing braille literacy and/or learning how to read braille). In other implementations, the braille character data can be displayed simultaneously on the reading area such that that the reader can read all the braille character data at the same time (e.g., for faster reading).

In some implementations, the user can position fewer than four fingertips on the contact surface of the reading area. The user can still read each of the braille character data as it is displayed because the braille character data can be repeated, like a wave, from a bottom portion to a top portion of the reading area or from the top portion to the bottom portion of the reading area. As a result, wherever one or more fingertips are positioned on the contact surface of the reading area, at least one of the fingertips can feel the pins as they are selectively extended from the contact surface.

Figure 9:
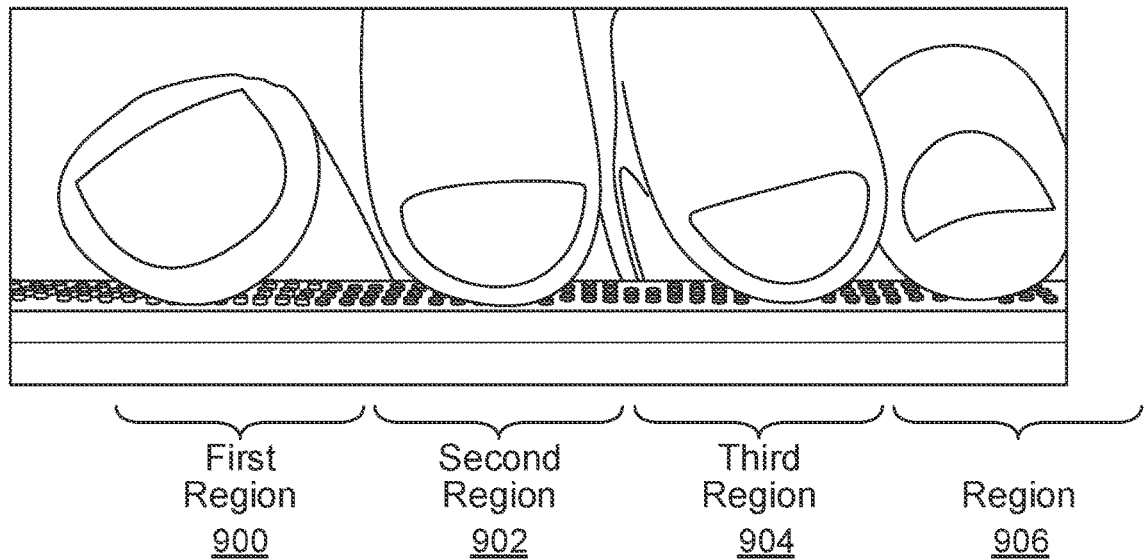
FIG. 9 depicts an exemplary actuation of the refreshable braille display system.

FIG. 9 depicts an exemplary actuation of the refreshable braille display apparatus described herein. As depicted, the apparatus includes a first region 900, a second region 902, a third region 904, and a fourth region 906. Each of the regions 900, 902, 904, and 906 can correspond to one or more contact units, each having a subset of a plurality of pins (e.g., refer to FIGS. 2A-C, 3-4). For example, the first region 900 can be a first contact unit having a first subset of the plurality of pins. The second region 902 can be a second contact unit having a second subset of the plurality of pins. The third region 904 can be a third contact unit having a third subset of the plurality of pins. The fourth region 906 can be a fourth contact unit having a fourth subset of the plurality of pins. As depicted, a user has four fingertips in contact with each of the respective regions 900, 902, 904, and 906.

As described throughout this disclosure (e.g., refer to FIG. 11), the apparatus can receive text data from a mobile device and can convert the text data into one or more braille character data. In the example of FIG. 9, the text can be converted into at least six characters, a first character 902, a second character 922, a third character 924, a fourth character 926, a fifth character 928, and a sixth character 930. In other examples, text data can be converted into any number of appropriate, corresponding braille character data.

Still referring to FIG. 9, at a first time 908, the first character 920 can be displayed in the first region 900. This can be accomplished by the controller described herein transmitting an electric current to the first region 900 to selectively extend one or more pins within that region (e.g., refer to FIGS. 5-6, 11). At a second time 910, the first character 920 can be displayed in the second region 902 and the second character 922 can be displayed in the first region 900. As a result, the user can verify the first character 902 by reading it in the second region 902 as well as reading the second character 922 for a first time. At a third time 812, the first character 920 can be displayed in the third region 904, the second character 922 can be displayed in the second region 902, and now the third character 924 can be displayed in the first region 900. Likewise, at a fourth time 914, the first character 920 can be displayed in the fourth region 906, the second character 922 can be displayed in the third region 904, the third character 924 can be displayed in the second region 902, and now the fourth character 926 can be displayed in the first region 900. At a fifth time 916, the first character 920 may no longer be displayed (e.g., alternatively, a reading area having more than four regions (e.g., contact units) can continue displaying characters), the second character 922 can be displayed in the fourth region 906, the third character 8924 can be displayed in the third region 904, the fourth character 926 can be displayed in the second region 902, and now the fifth character 928 can be displayed in the first region 900. Finally, in this example at a sixth time 918, the first character 920 and the second character 922 may no longer be displayed (e.g., alternatively, a reading area having more than four regions (e.g., contact units) can continue displaying characters), the third character 924 can be displayed in the fourth region 906, the fourth character 926 can be displayed in the third region 904, the fifth character 928 can be displayed in the second region 902, and now the sixth character 930 can be displayed in the first region 900.

The configuration depicted in FIG. 9 permits the user to read all the characters 900, 922, 924, 926, 928, and 930 together (e.g., at the times 910, 912, 914, 916, 918, etc.). In some implementations, the characters 900, 922, 924, 926, 928, and 930 can be repeated after the sixth time 918, such that the user can confirm the characters that the user read. This configuration can be advantageous for the user to learn how to read braille and/or to improve their braille literacy. In some implementations, the user can adjust an interval between the times 910, 912, 914, 916, 918, etc. (e.g., how much time passes between each of the times 910, 912, 914, 916, 918, etc.) in order to facilitate for slower and/or faster reading of braille characters. The user can make such adjustments via the mobile application described throughout this disclosure (e.g., refer to FIG. 1).

Figure 10:
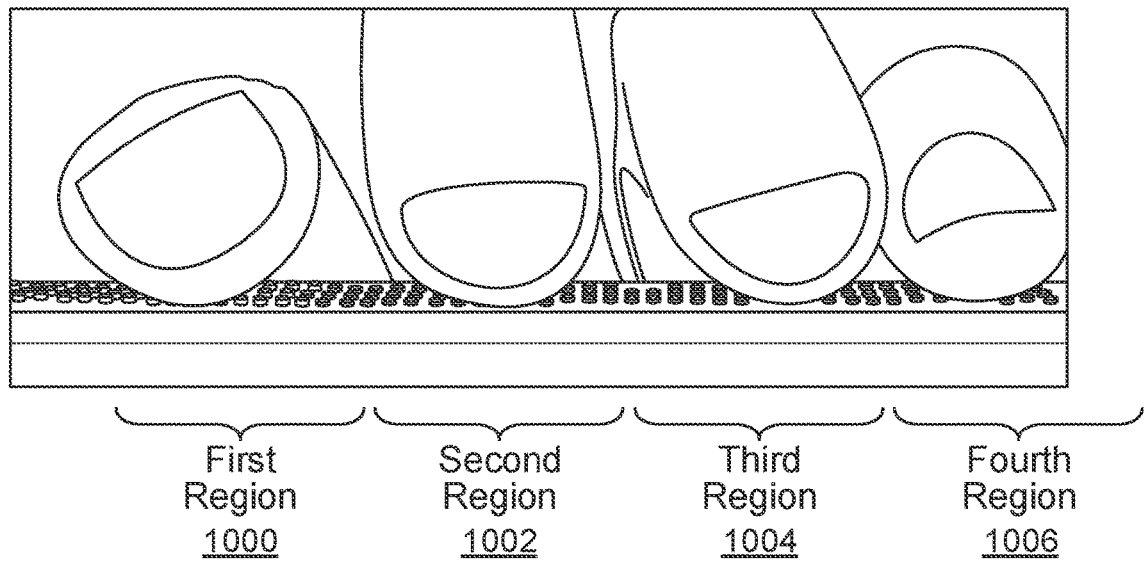
FIG. 10 depicts an exemplary actuation of the refreshable braille display system.

FIG. 10 depicts an exemplary actuation of the refreshable braille display apparatus described herein. Similar to the example in FIG. 9, in FIG. 10, a user places four fingers on a contact surface of the apparatus, wherein each fingertip is positioned on a respective region (e.g., contact unit): a first region 1000, a second region 1002, a third region 1004, and a fourth region 1006. Each of the regions 1000, 1002, 1004, 1006 can correspond to one or more contact units, each having a subset of a plurality of pins (e.g., refer to FIGS. 2A-C, 3-5). For example, the first region 1000 can be a first contact unit having a first subset of the plurality of pins. The second region 1002 can be a second contact unit having a second subset of the plurality of pins. The third region 1004 can be a third contact unit having a third subset of the plurality of pins. The fourth region 1006 can be a fourth contact unit having a fourth subset of the plurality of pins.

As described throughout this disclosure (e.g., refer to FIG. 11), the apparatus can receive text data from a mobile device and can convert the text data into one or more braille character data. In the example of FIG. 10, the text can be converted into at least eight characters, a first character 1012, a second character 1014, a third character 1016, a fourth character 1018, a fifth character 1020, a sixth character 1022, a seventh character 1024, and an eighth character 1026. In other examples, text data can be converted into any number of appropriate, corresponding braille character data.

As depicted in FIG. 10, at a first time 1008, the first character 1012 can be displayed in the first region 1000, the second character 1014 can be displayed in the second region 1002, the third character 1016 can be displayed in the third region 1004, and the fourth character 1018 can be displayed in the fourth region 1006. In this example, these four braille character data 1012, 1014, 1016, and 1018 are displayed at a same time (e.g., the first time 1008) so that the user can read multiple characters at once. This is advantageous for users that are literate in reading braille and/or are legally blind.

In some implementations, if the user's fingertips are not positioned over each of the regions 1000, 1002, 1004, and 1006, but rather are positioned over one or fewer of the regions, then a number of characters can be displayed that mirrors a number of regions having fingertips positioned over them. For example, if the user positions one finger over the first region 1000 and a second finger over the third region 1004, then at the first time 1008, the first character 1012 can be displayed in the first region 1000 and the second character 1014 can simultaneously be displayed in the third region 1016. Any remaining characters can be displayed in the first region 1000 and the second region 1004 in different time intervals. In some implementations, the regions 1000-1006 can include a sensor that detects whether the fingers make contact with the regions or are proximate to the regions. The sensor can be of various types, such as a contact sensor, a proximity sensor, a touch sensor, or any other suitable devices for detecting finger contact or presence proximate to the regions.

Referring back to FIG. 10, at a second time 1010, the fifth character 1020 can be displayed at the first region 1000, the sixth character 1022 can be displayed at the second region 1002, the seventh character 1024 can be displayed at the third region 1004, and the eighth character 1026 can be displayed at the fourth region 1006. As mentioned, the user can adjust how much time passes between each of the times 1008, 1010, etc. in order to facilitate for slower and/or faster reading of braille characters. The user can make such adjustments via the mobile application described throughout this disclosure (e.g., refer to FIG. 1).

In some implementations, each converted braille character (e.g., characters 1012, 1014, 1016, 1018) can be displayed at the first time 1008 in the corresponding regions 1000, 1002, 1004, and 1006. Then, at the second time 1010, the same braille characters can be repeated in each of the corresponding regions. This configuration can be advantageous so that the user can read a string of braille characters at a single time and then confirm or verify the string of braille characters at a second, delayed time before reading a new string of braille characters. In the example depicted in FIG. 10, if the string of characters ended at the eighth character 1026, then at a third time, the characters 1012, 1014, 1016, and 1018 can be repeated in the corresponding regions 1000, 1002, 1004, and 1006 and then at a fourth time, the characters 1020, 1022, 1024, and 1026 can be repeated in the corresponding regions 1000, 1002, 1004, and 1006.

In some implementations, the user can adjust how many times braille characters are repeated across the regions 1000, 1002, 1004, and 1006. In other implementations, as previously discussed in reference to FIG. 9, the user can adjust an amount of time that passes between the first time 1008, the second time 1010, etc. In yet other implementations, the user can select one or more of the regions 1000, 1002, 1004, and 1006 for display of the braille characters. For example, the user may determine that their fingertips are only in contact with the first region 1000 and the second region 1002. As a result, the user can select for braille characters to only be displayed at the first region 1000 and the second region 1002. This can be advantageous to reduce a frequency and cost of servicing one or more components of the refreshable braille display apparatus because not all of the components (e.g., the third subset of pins in the third region 1004 and the fourth subset of pins in the fourth region 1006) may be used often. In this example, the first subset of pins in the first region 1000 and the second subset of pins in the second region 1002 can require occasional maintenance while the third subset of pins in the third region 1004 and the fourth subset of pins in the fourth region 1006 may not require maintenance until they are actually used. Any of the adjustments/determinations made by the user can be made at the mobile application described throughout this disclosure (e.g., refer to FIG. 1).

The configurations depicted in FIGS. 9 and 10 are advantageous because they allow the user to read braille without moving their fingertips over a reading area. The user can read the braille by statically placing one or more of their fingertips over the reading area (e.g., regions 900, 902, 904, 906, 1000, 1002, 1004, 1006). The user's other hand can still interact with a display of the user's mobile device. As a result, the user can cut down on an amount of time and effort required to read the braille and interact with the mobile device.

Figure 11:
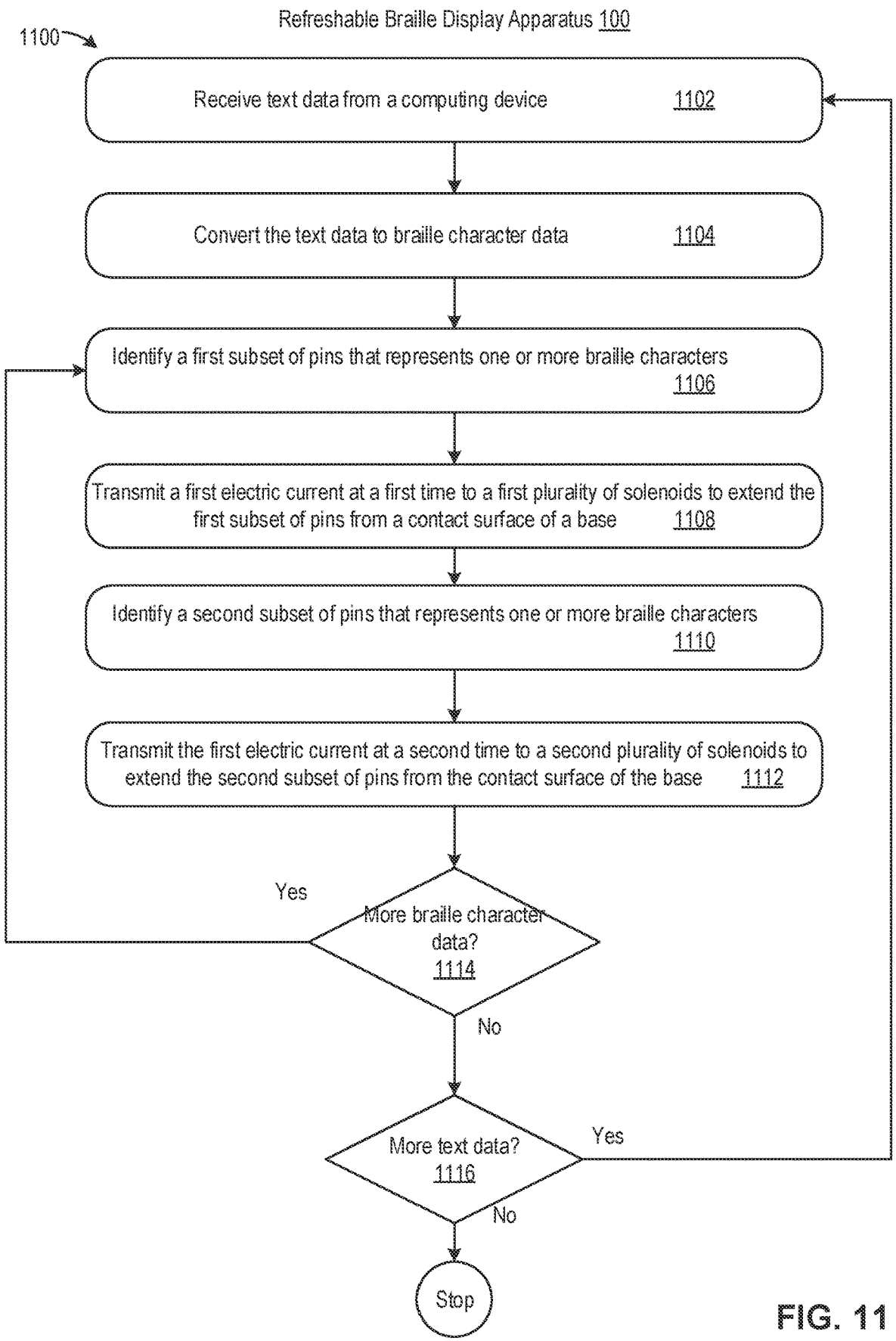
FIG. 11 is a flowchart to use the refreshable braille display system.

FIG. 11 is a flowchart of process 1100 to use the refreshable braille display apparatus 100 described herein. The process 1100 starts when the microcontroller of the apparatus 100 receives text data from a computing device in step 1102. As described herein, the computing device can be a smartphone or other mobile device such as a tablet, laptop, computer, kiosk, or other device having a touch screen display. The microcontroller can convert the text data to braille character data in step 1104. The microcontroller can use a dictionary (e.g., refer to the dictionary database 136 in FIG. 1) in order to convert the text data into braille character data. Next, based on the braille character data, the microcontroller can identify a first subset of pins that represents one or more braille characters in step 1106. The first subset of pins can be in a first contact unit. In some implementations, the microcontroller can identify a first subset of a plurality of solenoids that receive the first subset of pins, wherein the first subset of pins represents one or more braille characters corresponding to the text data. Based on step 1106, in step 1108, the microcontroller can transmit a first electric current to the first subset of the plurality of solenoids such that the first subset of pins moves to extend from a contact surface of the refreshable braille display apparatus described herein. Step 1108 can be performed at a first time.

In step 1110, the microcontroller can identify a second subset of pins that represents the one or more braille characters. The second subset of pins can be in a second contact unit. In some implementations, the microcontroller can identify a second subset of a plurality of solenoids that receive the second subset of pins, wherein the second subset of pins represents one or more of the braille characters corresponding to the text data. In step 1112, the microcontroller can transmit the first electric current to the second subset of the plurality of solenoids to extend the second subset of pins from the contact surface of the apparatus described herein (e.g., refer to FIG. 9). Step 1112 can be performed at a second time. The second time can be later than the first time.

Once the pins are extended from the contact surface, the microcontroller can determine whether there is more braille character data to be displayed in step 1114. If there is, then the microcontroller can return to step 1106 and repeat the steps described herein. If there is no more braille character data to display in step 1114, then the microcontroller can determine whether there is more text data in step 1116. If there is not, then the process 1100 ends. If there is more text data, then the microcontroller returns to step 1102 and repeats the steps described herein. For example, in some implementations, the microcontroller can receive second text data from the computing device and convert the second text data into second braille character data. Based on the second braille character data, the microcontroller can identify a third subset of pins or a third subset of the plurality of solenoids that receives the third subset of pins. The third subset of pins can be in a first contact unit. In other implementations, the third subset of pins can be in any contact unit (e.g., a second, third, fourth contact unit). The third subset of pins can represent a second braille character that corresponds to the second text data received from the computing device. Finally, the microcontroller can be configured to transmit the first electric current to the third subset of the plurality of solenoids such that the third subset of pins moves to extend from the contact surface of the refreshable braille display apparatus described herein. The first electric current can be transmitted at a third time.

Still referring to FIG. 11, in some implementations, the third time can be identical to the second time. The third time can be later than the second time. Additionally, the second time can be identical to the first time. The second time can be later than the first time. In yet other implementations, the third time can be earlier than the second time and later than the first time.

Figure 12:
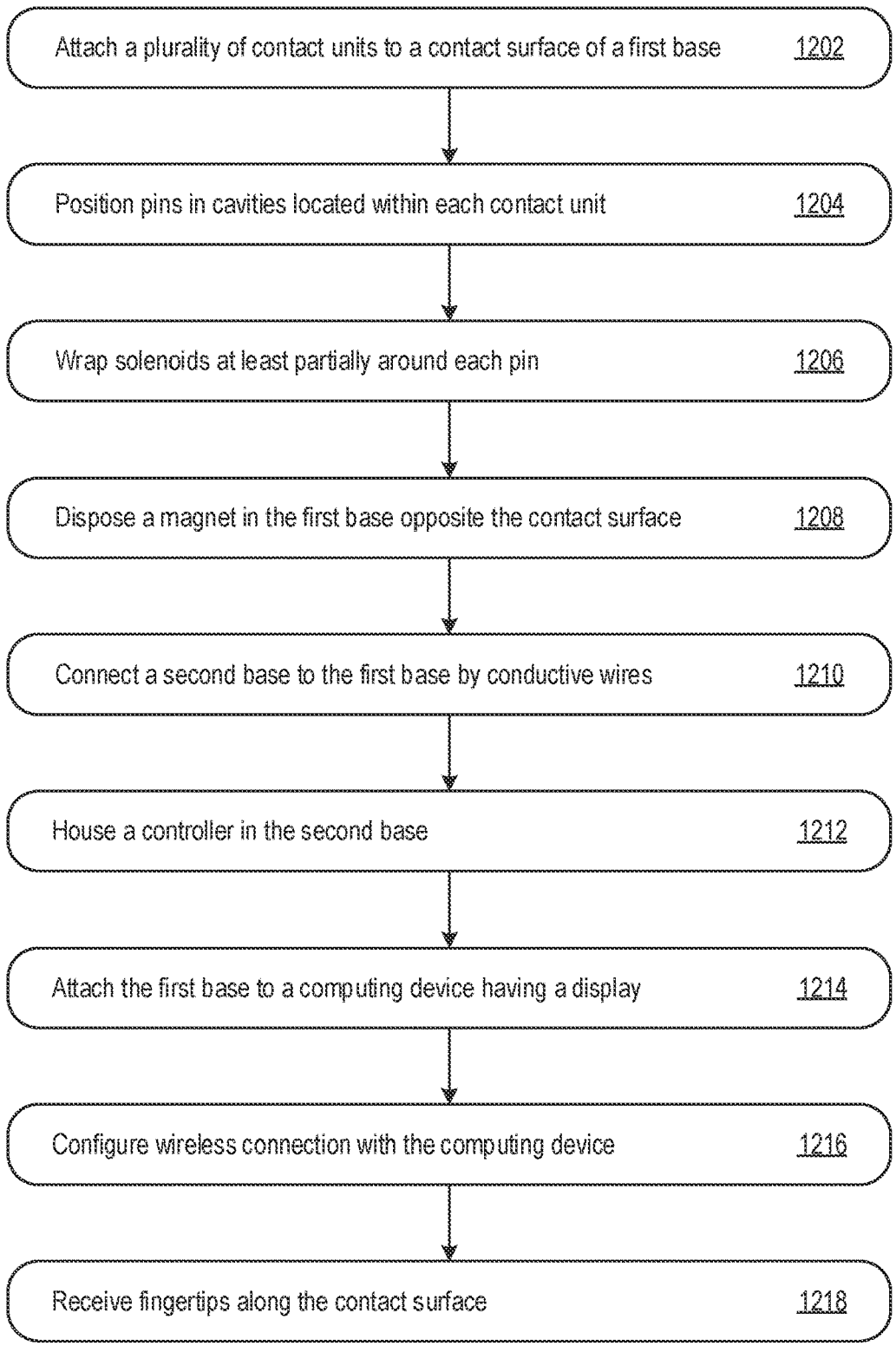
FIG. 12 is a flowchart to assemble the refreshable braille display system.

FIG. 12 is a process 1200 to assemble the refreshable braille display apparatus described herein. First, a user can attach a plurality of contact units to a contact surface of a first base in step 1202. Each of the contact units can have a base that couples to a side of the first base. The contact units can be positioned side-by-side along the contact surface of the first base so that the contact units are aligned with each other. In step 1204, a plurality of braille pins can be positioned within a plurality of cavities located within each contact unit. For example, if the contact unit has six cavities, six pins can be positioned within the cavities. In step 1206, solenoids can be at least partially wrapped around each of the pins. A magnet can be disposed in a housing in the first base that is opposite the contact surface in step 1208. Next, a second base can be connected to the first base using one or more conductive wires that are configured to the first base (step 1210). A controller can be housed in the second base in step 1212. Then, in step 1214, the first base can be attached to a computing device having a display. As described throughout this disclosure, the refreshable braille display apparatus described herein can be a case for a smartphone or other mobile or computing device. Therefore, in step 1214, the first base (e.g., the case) can be attached (e.g., snapped) around the smartphone. In step 1216, the user can configure wireless communication (e.g., connection) with the computing device. The communication can be established using a mobile application and BLUETOOTH technology, as described throughout this disclosure (e.g., refer to FIG. 1). Finally, in step 1218, the contact surface of the first base can receive at least one fingertip.

Figure 13:
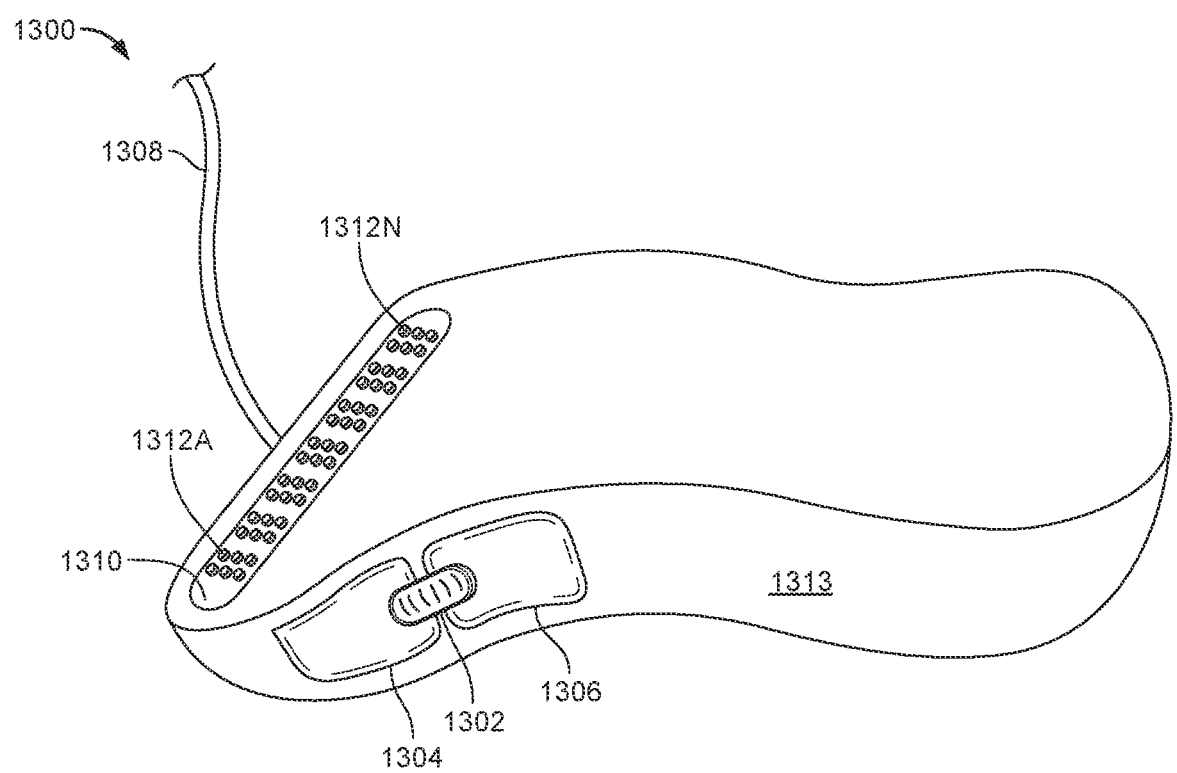
FIG. 13 depicts an exemplary refreshable braille display mouse.

FIG. 13 depicts an exemplary refreshable braille display mouse 1300. The mouse 1300 can include a scroll wheel 1302, a left click button 1304, a right click button 1306, a cable 1308 (e.g., USB) for connecting the mouse 1300 to a computer system or device, and a reading area 1310. The reading area can include a plurality of braille pins 1312A-N, as depicted and described throughout this disclosure. In other implementations, the mouse 1300 can include more or less buttons, wheels, or other types of input elements than those described in FIG. 13. Further, where the mouse 1300 is configured to be wireless, the mouse 1300 can include a wireless transmitter/receiver instead of the cable 1308.

The mouse 1300 can allow for blind users to navigate a graphical user interface (GUI) display of a computer or laptop while simultaneously reading content that is displayed via the reading area 1310. The reading area 1310 includes modular refreshable braille pins 1312A-N as described herein. A user can place fingertips, such as four fingertips, on top of the reading area 1310 and read the content displayed on the computer in Braille, as the pins 1312A-N automatically move from right to left to simulate a Braille reading process.

Placement of the scroll wheel 1302, the left click button 1304, and the right click button 1306 on a left side 1314 of the mouse 1300 is advantageous for right-handed users to use their thumb to maneuver the computer display while simultaneously reading Braille in the reading area 1310. The mouse 1300 can also be designed and configured to be used by left-handed users. In other words, a left-handed mouse can include the scroll wheel 1302, the left click button 1304, and the right click button 1306 on a right side of the mouse.

As an example use, if the user moves the mouse 1300 and a cursor points at a "Desktop" folder on the computer display, the characters 'D' 'E' 'S' 'K' 'T' 'O' 'P' can be read by the user at the reading area 1310 as the braille pins 1312A-N automatically move from right to left (or left to right as desired) to spell out Desktop. The user can feel these characters moving through the pinky finger to the index finger as they are positioned over the reading area 1310. As a result, the user can correctly discern that the cursor is pointing to the Desktop folder. The user can then double press on the left click button 1304 using their thumb to open the folder or single press the right click button 1306 with the same thumb to access the folder options. The scroll wheel 1302 can also be used by the thumb to move through contents in the Desktop folder. The mouse 1300 can allow blind users to efficiently navigate computer screens using only one hand, while also allowing them to benefit from literacy skills that Braille provides in the reading area 1310. As a result, the users may not have to rely on screen readers on their computers to read and navigate the computer screens. Moreover, the users may not be required to connect external Braille display systems to their computers that require moving back and forth to read content in Braille.

Figure 14:
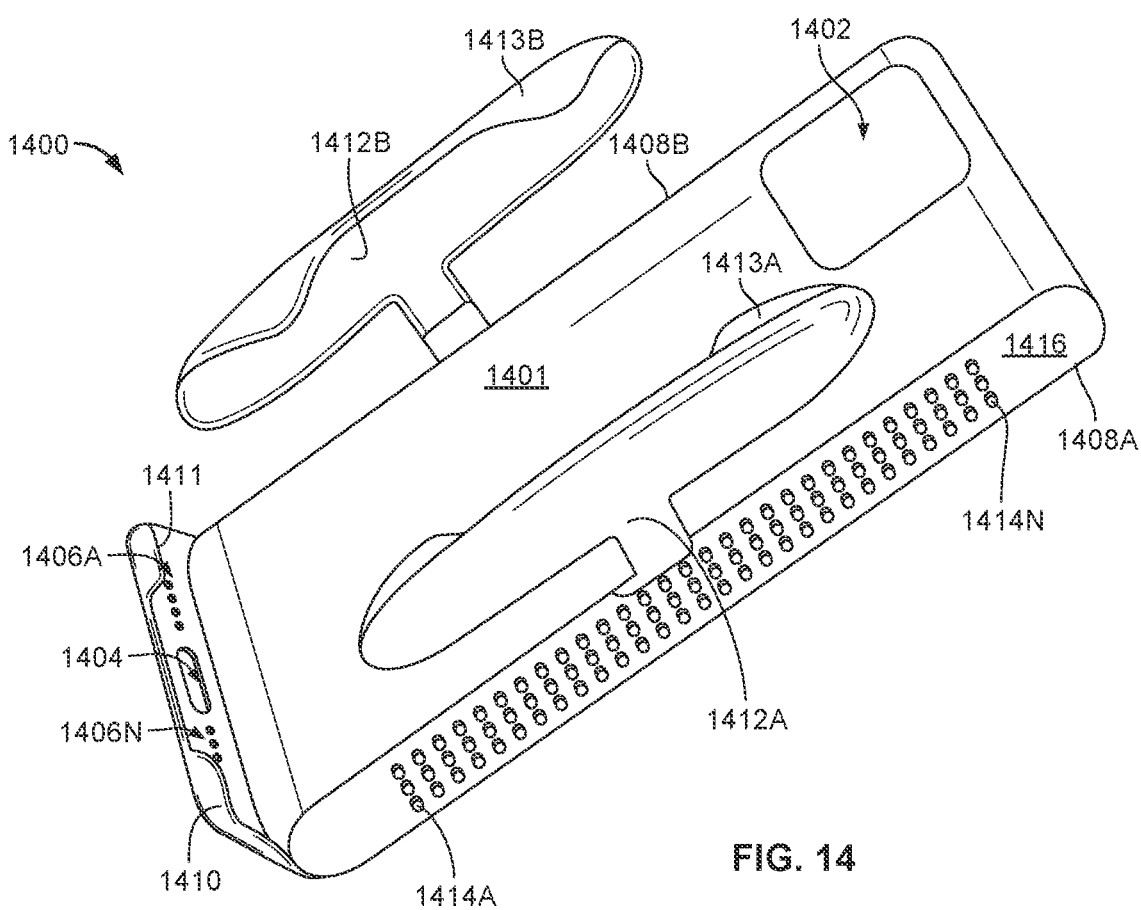
FIG. 14 depicts an exemplary refreshable braille display smartphone mount case.

FIG. 14 depicts an exemplary refreshable braille display smartphone mount case 1400. In some implementations, the mount case 1400 has a modular design such that it can be used with any size smartphone. Alternatively, the mount case 1400 can be customized to fit a particular smartphone model. The mount case 1400 can therefore be dynamically adjusted to accommodate size of different smartphones. The mount case 1400 includes a base 1401, a camera opening 1402, first and second sides 1408A and 1408B, a base support 1410, and adjustable side mounts 1412A and 1412B. A smartphone can be placed against the base 1401 such that the smartphone's camera aligns with the camera opening 1402. The camera opening 1402 can slide vertically up and down to dynamically adjust for different length smartphones that may be used with the mount case 1400.

Each of the sides 1408A and 1408B of the mount case 1400 can include respective reading areas 1416. The reading area 1416 includes modular refreshable braille pins 1414A-N, as described herein. A user can place fingertips, such as four fingertips, on top of the reading area 1416 and read content displayed on the user's smartphone in Braille, as the pins 1414A-N automatically move from right to left to simulate a Braille reading process, as described throughout this disclosure. In some implementations, the braille pins 1414A-N can be on one of the sides 1408A and 1408B of the mount case 1400. For example, a mount case 1400 intended for left handed users can include the reading area 1416 having the braille pins 1414A-N on the right side 1408B. A mount case 1400 intended for right handed users can include the reading area 1416 having the braille pins 1414A-N on the left side 1408A.

The base support 1410 can include a charging port opening 1404 and microphone and/or speaker openings 1406A-N. The charging port opening 1404 can be sized such that any smartphone's charging port can be accessed via the opening 1404. In some implementations, one or more variations of the mount case 1400 can be made having different sized charging port openings 1404 to accommodate for different types of smartphones. The openings 1406A-N can be a same size as microphones and/or speakers of a smartphone. As an example, if a smartphone has 5 speakers on each side of the smartphone's charging port, then the mount case 1400 can have 5 openings 1406A-N on each side of the charging port opening 1404. In some implementations, a singular opening 1406A can extend along a length on one side of the charging port opening 1404 and a second opening 1406B can extend along a length on a second side of the charging port opening 1404. The first and second openings 1406A and 1406B can be opposite each other. As a result of such a configuration, the mount case 1400 can accommodate for placement, arrangement, and/or quantity of microphones and/or speakers along a bottom portion of different types of smartphones.

The base support 1410 can also include a protruding edge 1411 that extends along a length of the base support 1410. The protruding edge 1411 can extend upwards from the base station 1400 and be configured to engage a portion of a front face of a smartphone received at the mount case 1400, thereby retaining the bottom portion of the smartphone at the base support 1410 and restricting the smartphone from sliding out of the mount case 1400. In some implementations, the protruding edge 1411 can cup corners (curved corners) that correspond to the bottom corners of the smartphone and are configured to cover the bottom corners of the smartphone to thereby retain the smartphone in the mount case 1400.

The adjustable side mounts 1412A and 1412B can extend out from the respective first and second sides 1408A and 1408B of the mount case 1400. Each of the adjustable side mounts 1412A and 1412B can include respective protruding edges 1413A and 1413B that can be configured to retain the smartphone in the mount case 1400. The protruding edges 1413A and 1413B can hold partially around edges of each side of the smartphone. The edges 1413A and 1413B may not extend over a screen portion of the smartphone. The adjustable side mounts 1412A and 1412B can be expanded outwards, and retracted inwards, to accommodate smartphones of different widths. For example, when the user places the smartphone on top of the base 1401, the user can extend the adjustable side mounts 1412A and 1412B out to sides of the smartphone such that the smartphone is flush with the base 1401 and the protruding edges 1413A and 1413B clamp over side edges of the smartphone. The adjustable side mounts 1412A and 1412B can retract to a sizing that retains the smartphone in place in the mount case 1400.

The mount case 1400 depicted in FIG. 14 can be advantageous for users to use any type of smartphone with the refreshable braille display technology described throughout this disclosure. As described herein, the mount case 1400 allows the user to read Braille without having to move their fingertips across the reading area 1416. In some implementations, the adjustable side mounts 1412A and 1412B can be made of a plastic material. In some implementations, at least one of the base 1401, the first and second sides 1408A and 1408B, the base support 1410, and the reading area 1416 can be encased in aluminum. In some implementations, the base support 1410 can be made of a plastic material. In yet some implementations, one or more of the base 1401, the first and second sides 1408A and 1408B, the base support 1410, and the reading area 1416 can be coated with a plastic and/or silicone gel material with varying degrees of texture. The plastic and/or silicone gel coating can be advantageous to align with the user's handling of their device as well as aesthetic appeal of the mount case 1400.

Figure 15:
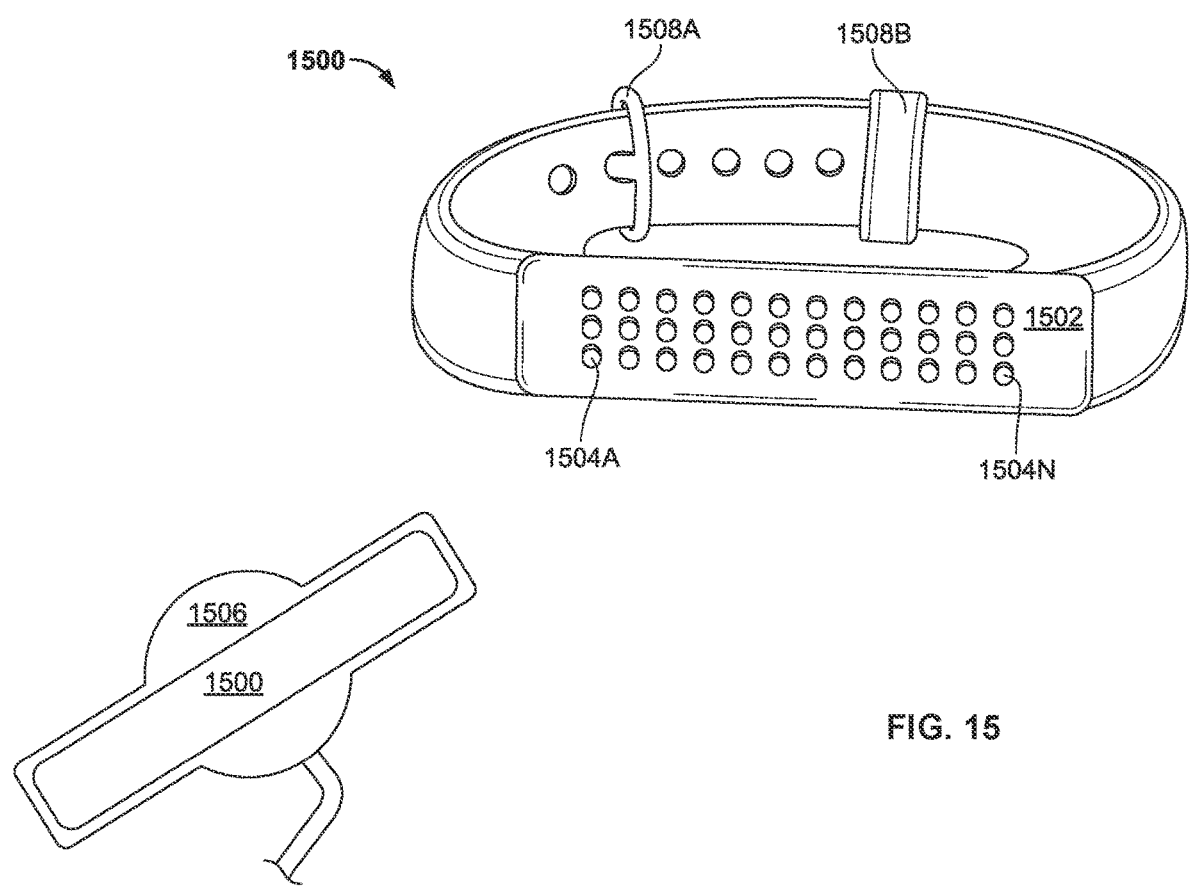
FIG. 15 depicts an exemplary refreshable braille display wearable device.

FIG. 15 depicts an exemplary refreshable braille display wearable device 1500. The wearable device 1500 can be a bracelet, smart watch, and/or other device that can be worn around a user's wrist or arm. The wearable device 1500 can be adjusted to fit on any size wrist or arm of a user. Similar to the other devices and cases described throughout this disclosure, the wearable device 1500 can include a reading area 1502 with a plurality of braille pins 1504A-N. The braille pins 1504A-N can function as described throughout this disclosure. The wearable device 1500 can also include a wireless charger 1506. The user can, for example, place any portion of the wearable device 1500 on top of the wireless charger 1506 to begin charging. Accordingly, components of the refreshable braille display system as described herein can be charged such that the braille pins 1504A-N can automatically move to allow the user to read content displayed on their mobile device.

The user can place their fingertips over the reading area 1502 in order to read braille. The wearable device 1500 can also include clock functionalities so that the user can check the time. Moreover, the wearable device 1500 can connect to the user's smartphone via wireless connection (e.g., WIFI, BLUETOOTH). Notifications, calls, and health monitoring of the smartphone can be translated into braille and presented at the reading area 1502, as described throughout this disclosure. In some implementations, the smartwatch 1500 can be made of an aluminum or similar material. Such material can provide durability. In some implementations, straps 1508A and 1508B can be made of silicone gel material or similar flexible material. Such material can provide for aesthetic appearance and comfortability. The straps 1508A and 1508B can also have a colorful finishing for customization and aesthetic appeal.

Any one or more of the devices and cases described herein (e.g., case 200, case 400, first and second bases 500 and 520, apparatus 700, mouse 1300, mount case 1400, wearable device 1500, etc.) can be enclosed in aluminum or similar material. The aluminum can provide durability and rigidness for one or more components of the refreshable braille display system describe herein, such as solenoid actuators. Outer materials of such devices and cases can also be coated with plastic and/or silicone gel materials. The plastic and/or silicone gel materials can have varying degrees of texture (e.g., smooth, ribbed, etc.) to align with the user's handling of their device. The varying degrees of texture and plastic and/or silicone gel materials can also provide aesthetic appeal.

Figure 16:
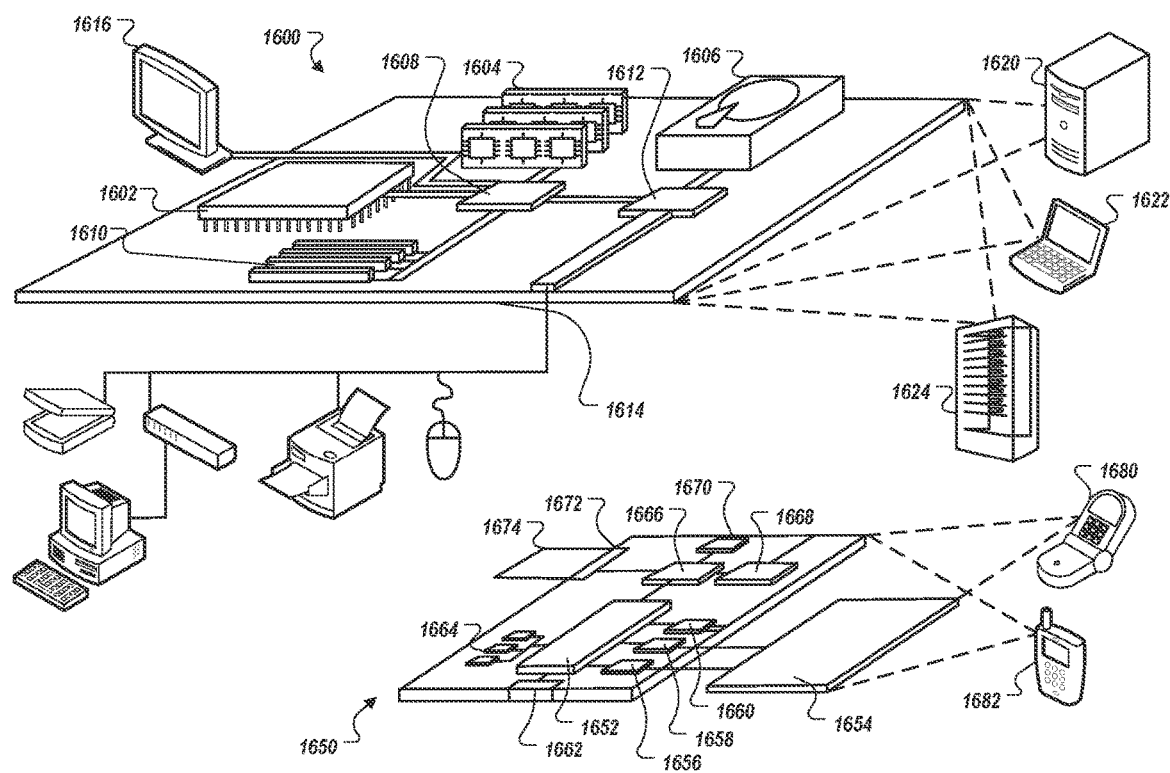
FIG. 16 is a block diagram of computing devices that may be used to implement the apparatuses, systems and methods described herein.

FIG. 16 is a block diagram of computing devices 1600, 1650 that may be used to implement the systems and methods described in this document, as either a client or as a server or plurality of servers. Computing device 1600 is intended to represent various forms of digital computers, such as laptops, desktops, workstations, personal digital assistants, servers, blade servers, mainframes, and other appropriate computers. Computing device 1650 is intended to represent various forms of mobile devices, such as personal digital assistants, cellular telephones, smartphones, and other similar computing devices. Additionally computing device 1600 or 1650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high speed interface 1608 connecting to memory 1604 and high speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of functions is exemplary only. In one implementation, the high speed controller 1608 is coupled to memory 1604, display 1616 (e.g., through a graphics processor or accelerator), and to high speed expansion ports 1610, which may accept various expansion cards (not shown). In the implementation, low speed controller 1612 is coupled to storage device 1606 and low speed expansion port 1614. The low speed expansion port, which may include various communication ports (e.g., USB. Bluetooth. Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. Additionally, the processor may be implemented using any of a number of architectures. For example, the processor 1602 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT (Thin-Film-Transistor Liquid Crystal Display) display or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provide in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provide as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652 that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA. PDC, WCDMA, CDMA2000, or GPRS, among others. Such communication may occur, for example, through radio-frequency transceiver 1668. In addition, short-range communication may occur, such as using a Bluetooth, WiFi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smartphone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A mobile device case for refreshable braille display, the mobile device case comprising:
    a contact surface on a portion of the mobile device case, the contact surface being exposed when a mobile device is fitted within the mobile device case, wherein the contact surface is opposite a device-facing surface of the mobile device case, the device-facing surface being configured to be in contact with a back surface of the mobile device when the mobile device is fitted within the mobile device case;
    a plurality of cavities in the contact surface;
    a plurality of braille pins housed within the plurality of cavities, the plurality of braille pins being configured to selectively move in the plurality of cavities; and
    a controller configured to selectively move the plurality of braille pins to extend from the contact surface in response to receiving signals from the mobile device.

2. The mobile device case of claim 1, wherein the mobile device comprises a tablet.

3. The mobile device case of claim 1, wherein the mobile device comprises a mobile phone.

4. The mobile device case of claim 1, wherein the portion of the mobile device case is a back side of the mobile device case.

5. The mobile device case of claim 1, wherein the portion of the mobile device case is a left or right side of the mobile device case.

6. The mobile device case of claim 1, wherein the contact surface is configured to receive fingertips of a user interacting with the mobile device.

7. The mobile device case of claim 1, wherein the contact surface is a braille reading area.

8. The mobile device case of claim 1, wherein the signals from the mobile device comprise user input indicating interactions of a user with information displayed at the mobile device.

9. The mobile device case of claim 1, further comprising a power source positioned within the mobile device case and configured to power the controller to selectively move the plurality of braille pins.

10. The mobile device case of claim 9, wherein the power source is a battery.

11. The mobile device of claim 10, wherein the battery is rechargeable.

12. The mobile device case of claim 1, further comprising a communication interface configured to pair the mobile device case with the mobile device and receive the signals from the mobile device.

13. The mobile device case of claim 12, wherein the communication interface comprises a wired communication interface configured to provide a wired communication between the mobile device case and the mobile device when the mobile device is paired with the mobile device case.

14. The mobile device case of claim 12, wherein the communication interface comprises a wireless communication interface configured to provide a wireless communication between the mobile device case and the mobile device when the mobile device is paired with the mobile device case.

15. The mobile device case of claim 14, wherein the wireless communication comprises a BLUETOOTH connection.

16. The mobile device case of claim 12, wherein the controller is configured to selectively move the plurality of braille pins in response to receiving the signals from the mobile device over the communication interface.

17. The mobile device case of claim 1, wherein the plurality of braille pins are configured to dynamically move in a pattern that is in response to user interactions with the mobile device.

18. The mobile device case of claim 1, wherein one or more of the plurality of cavities are removable from the contact surface.

19. The mobile device case of claim 1, wherein the controller is further configured to:
    receive text data from the mobile device;
    convert the text data into braille character data;
    based on the braille character data, identify a subset of the plurality of braille pins, wherein the subset of the plurality of pins represents one or more braille characters corresponding to the text data; and
    move the subset of the plurality of braille pins to extend from the contact surface.

20. The mobile device of claim 1, further comprising a plurality of solenoids configured to at least partially operably connect to the plurality of braille pins, wherein the controller is further configured to selectively provide an electric current to the plurality of solenoids to generate magnetic fields through the plurality of solenoids, wherein the magnetic fields are configured to selectively move the plurality of braille pins to extend from the contact surface.

\* \* \* \* \*